United States Patent
Azizi et al.

(10) Patent No.: US 10,620,951 B2
(45) Date of Patent: Apr. 14, 2020

(54) MATRIX MULTIPLICATION ACCELERATION OF SPARSE MATRICES USING COLUMN FOLDING AND SQUEEZING

(71) Applicant: Intel Corporation, Santa Clara, CA (US)

(72) Inventors: Omid Azizi, Redwood City, CA (US); Guy Boudoukh, Ramat Hasharon (IL); Tony Werner, Los Altos, CA (US); Andrew Yang, Cupertino, CA (US); Michael Rotzin, Santa Clara, CA (US); Chen Koren, Hadera (IL); Eriko Nurvitadhi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 14 days.

(21) Appl. No.: 16/016,278

(22) Filed: Jun. 22, 2018

(65) Prior Publication Data
US 2019/0042237 A1     Feb. 7, 2019

(51) Int. Cl.
*G06F 9/30* (2018.01)
*G06F 17/16* (2006.01)
*G06F 9/38* (2018.01)

(52) U.S. Cl.
CPC .......... *G06F 9/3001* (2013.01); *G06F 9/3016* (2013.01); *G06F 9/30036* (2013.01); *G06F 9/3802* (2013.01); *G06F 17/16* (2013.01)

(58) Field of Classification Search
CPC .. G06F 16/2237; G06F 2212/454; G06F 7/76; G06F 7/78; G06F 17/16; G06F 9/3001; G06F 9/30036
See application file for complete search history.

(56) References Cited

U.S. PATENT DOCUMENTS

| 5,206,822 A * | 4/1993 | Taylor ................. G06F 15/8061 708/607 |
| 6,243,734 B1 * | 6/2001 | Doshi ..................... G06F 17/16 708/607 |

(Continued)

OTHER PUBLICATIONS

A. Morad, L. Yavits, and R. Ginosar, "Efficient dense and sparse matrix multiplication on GP-SIMD", 24th International Workshop on Power and Timing Modeling Optimization and Simulation (PATMOS), pp. 1-8, 2014 (Year: 2014).*

(Continued)

*Primary Examiner* — Matthew D Sandifer
(74) *Attorney, Agent, or Firm* — Nicholson De Vos Webster & Elliott, LLP

(57) ABSTRACT

Disclosed embodiments relate to sparse matrix multiplication (SMM) acceleration using column folding and squeezing. In one example, a processor, in response to a SMM instruction having fields to specify locations of first, second, and output matrices, the second matrix being a sparse matrix, uses execution circuitry to pack the second matrix by replacing one or more zero-valued elements with non-zero elements yet to be processed, each of the replaced elements further including a field to identify its logical position within the second matrix, and, the execution circuitry further to, for each non-zero element at row M and column K of the specified first matrix, generate a product of the element and each corresponding non-zero element at row K, column N of the packed second matrix, and accumulate each generated product with a previous value of a corresponding element at row M and column N of the specified output matrix.

20 Claims, 27 Drawing Sheets

(56) References Cited

U.S. PATENT DOCUMENTS

| | | | | |
|---|---|---|---|---|
| 10,146,740 B1* | 12/2018 | Vasiloglou | ............. | G06F 17/16 |
| 10,275,479 B2* | 4/2019 | Zhao | ...................... | G06F 16/22 |
| 2012/0249560 A1* | 10/2012 | Dickenson | ............. | G06F 17/16 |
| | | | | 345/505 |
| 2015/0067009 A1* | 3/2015 | Strauss | .................. | G06F 17/16 |
| | | | | 708/203 |
| 2019/0042542 A1* | 2/2019 | Narayanamoorthy | ...................... | |
| | | | | G06F 9/30036 |

OTHER PUBLICATIONS

Sardar Anisul Hague, "A Computational Study of Sparse Matrix Storage Schemes", M.Sc. Thesis, Department of Mathematics and Computer Science, University of Lethbridge, 2008 (Year: 2008).*
Han et al., "EIE: Efficient Inference Engine on Compressed Deep Neural Network", arXiv:1602.01528v2 [cs.CV], May 3, 2016, 12 pages.
Parashar et al., "SCNN: An Accelerator for Compressed-sparse Convolutional Neural Networks", 2017 ACM/IEEE 44th Annual International Symposium on Computer Architecture (ISCA), Jun. 24-28, 2017, 14 pages.

* cited by examiner

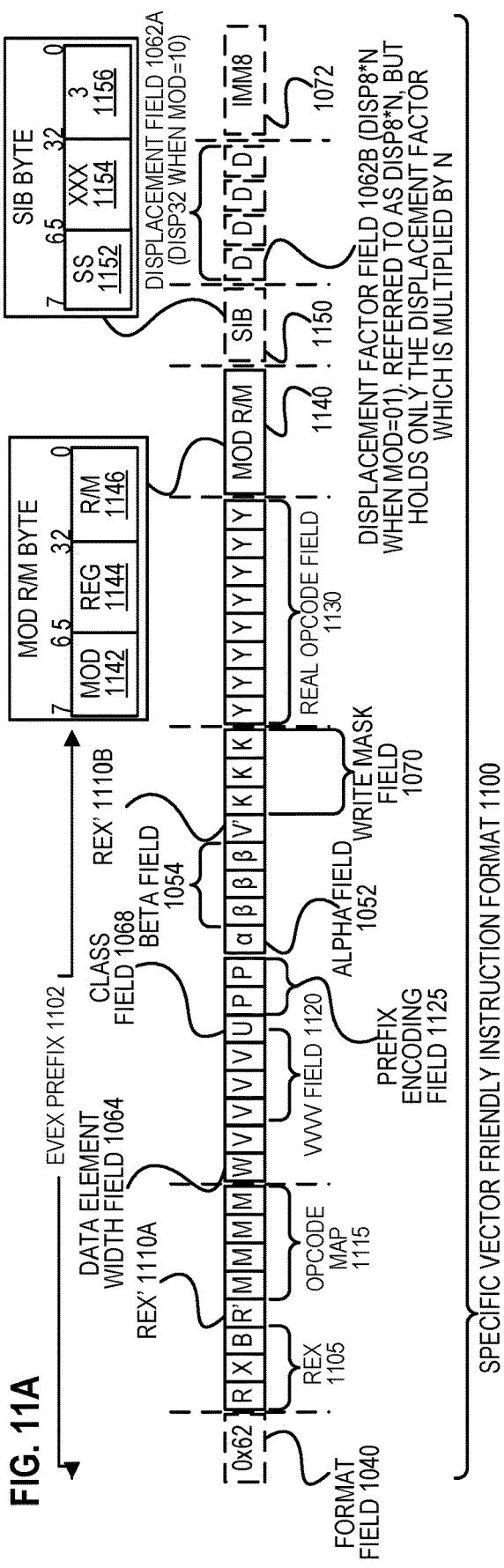
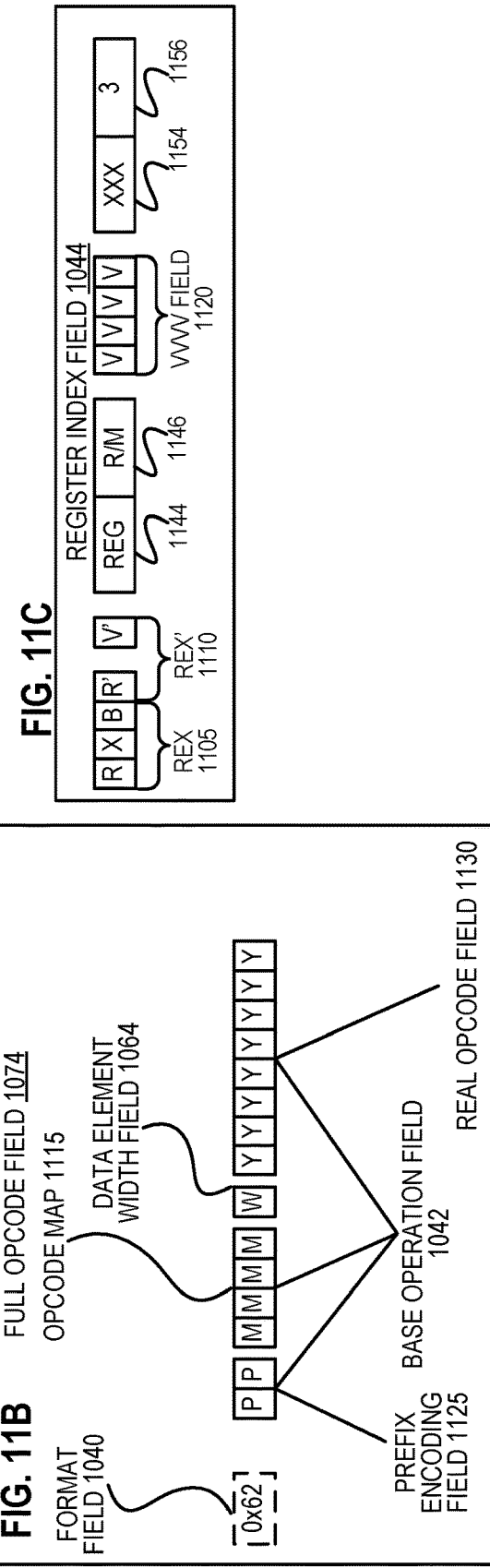

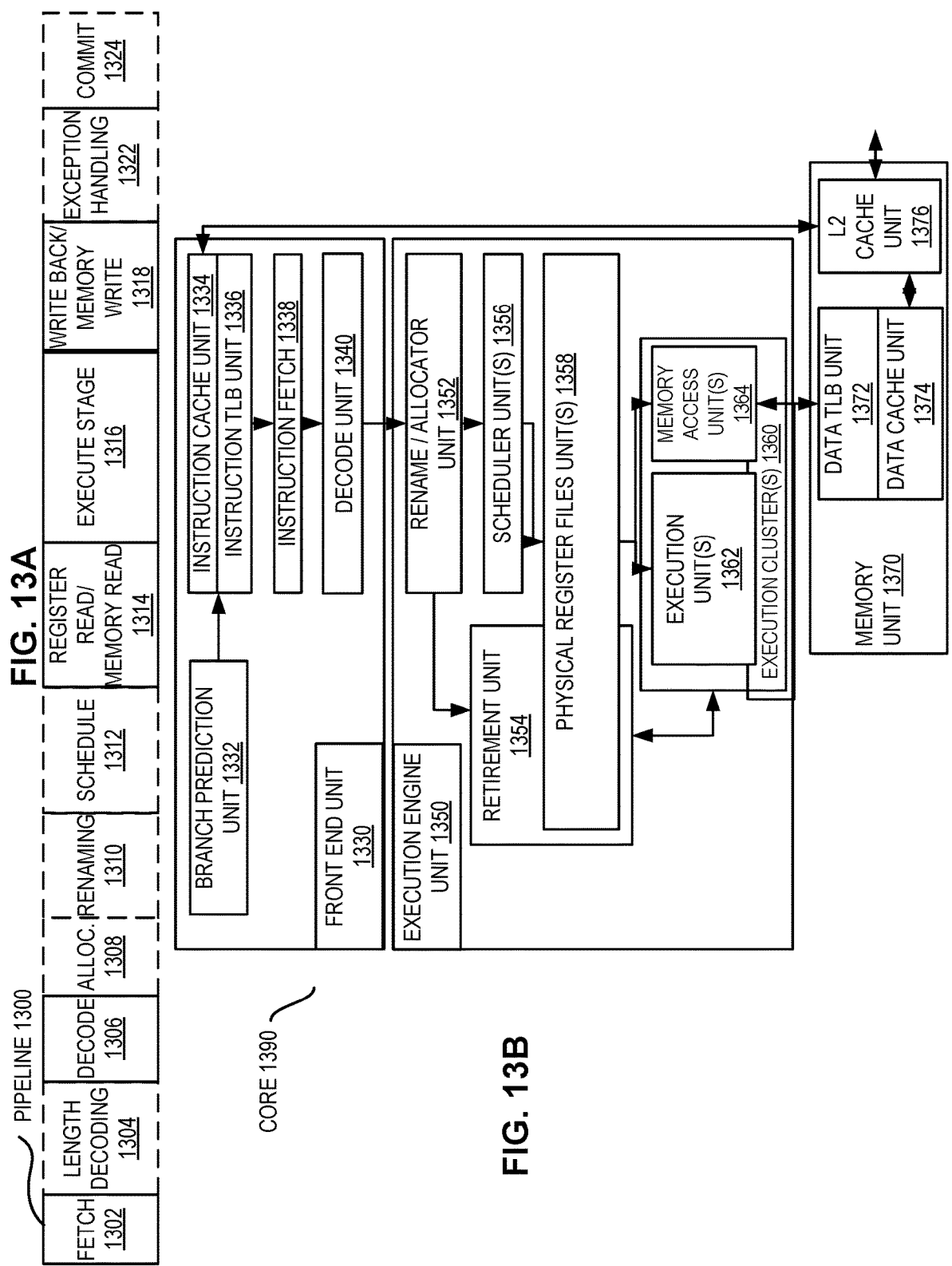

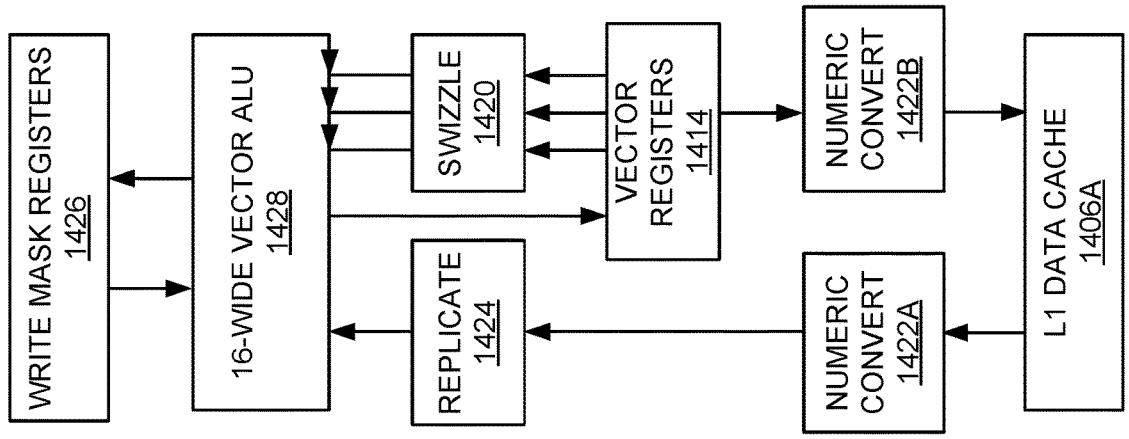
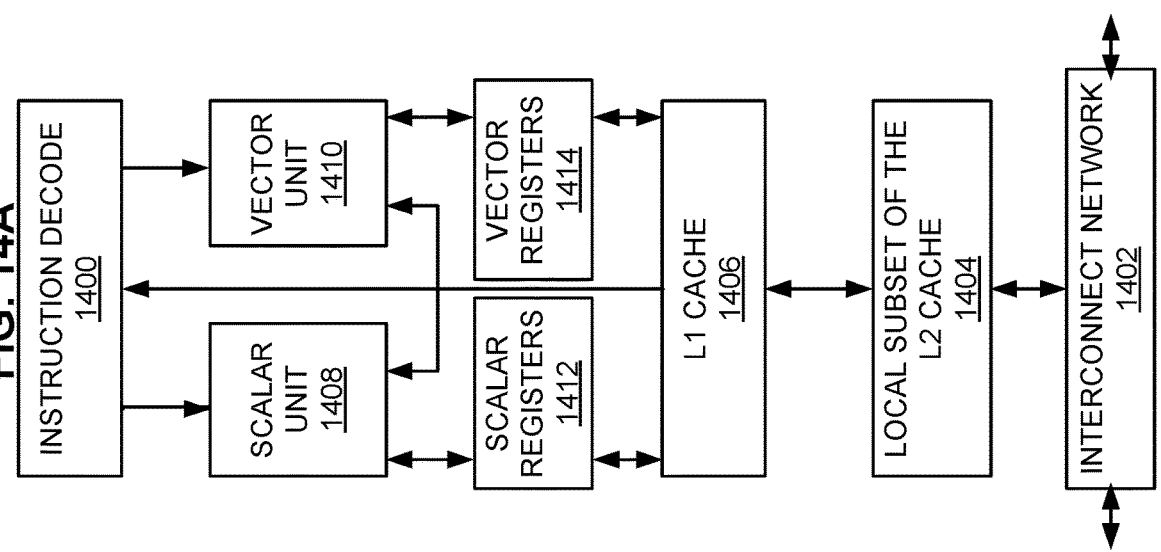

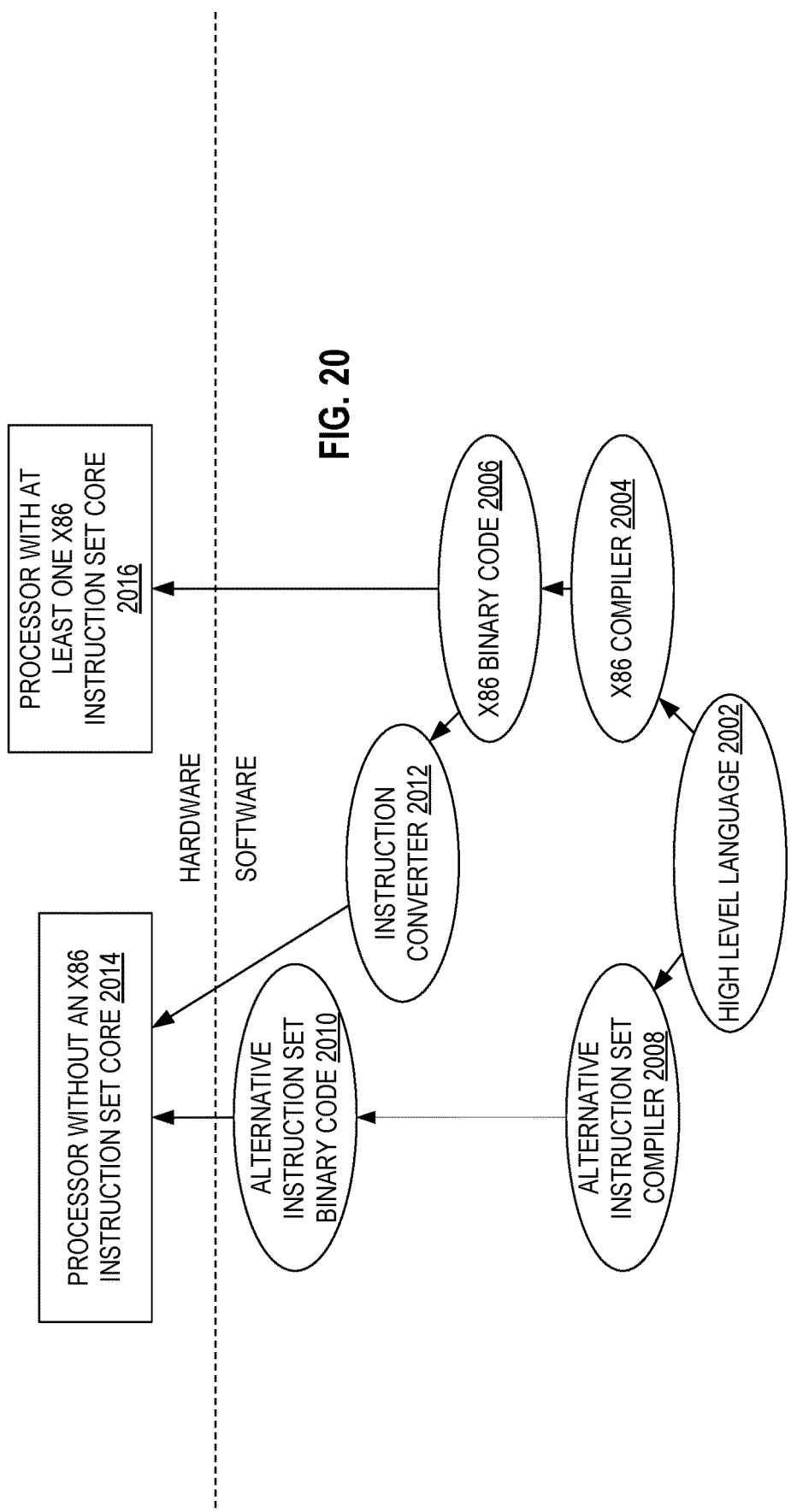

MATRIX MULTIPLICATION ACCELERATION OF SPARSE MATRICES USING COLUMN FOLDING AND SQUEEZING

FIELD OF THE INVENTION

The field of invention relates generally to computer processor architecture, and, more specifically, to matrix multiplication acceleration of sparse matrices using column folding and squeezing.

BACKGROUND

Many of today's hardware accelerators for neural networks perform mainly matrix multiplication in a dense format, not taking into account the fact that there is a large percentage of zeros found in one (or both) matrixes. This introduces inefficient usage of hardware resources (multiplying with 0) and power wasting.

Today's hardware accelerators for neural networks, both for training and inference, all compete to achieve the best raw performance numbers and power-to-performance ratio values. Exploiting the native and injected sparsity in those neural networks is one way to get a lead in this competition.

Machine learning architectures, such as deep neural networks, have been applied to fields including computer vision, speech recognition, natural language processing, audio recognition, social network filtering, machine translation, bioinformatics and drug design.

Matrix multiplication is a key performance/power limiter for many algorithms, including machine learning. Some conventional matrix multiplication approaches are specialized, for example they lack the flexibility to support a variety of data formats (signed and unsigned 8b/16b integer, 16b floating-point) with wide accumulators, and the flexibility to support both dense and sparse matrices.

The problem being addressed herein is to increase the performance and power-efficiency of neural network processing chips by more efficiently processing matrix multiplies in the presence of sparsity in the input data set (sparse matrices have a density of less than 1.0, meaning that less than 100% of their elements have non-zero values). In particular, this problem is addressed, while simultaneously maintaining the performance for dense (non-sparse) matrix multiplication.

BRIEF DESCRIPTION OF THE DRAWINGS

The present invention is illustrated by way of example and not limitation in the figures of the accompanying drawings, in which like references indicate similar elements and in which:

FIG. 10A is a block diagram illustrating a generic vector friendly instruction format and class A instruction templates thereof according to some embodiments of the invention;

FIG. 10B is a block diagram illustrating the generic vector friendly instruction format and class B instruction templates thereof according to some embodiments of the invention;

FIG. 11A is a block diagram illustrating an exemplary specific vector friendly instruction format according to some embodiments of the invention;

FIG. 11B is a block diagram illustrating the fields of the specific vector friendly instruction format that make up the full opcode field according to one embodiment;

FIG. 11C is a block diagram illustrating the fields of the specific vector friendly instruction format that make up the register index field according to one embodiment;

FIG. 13A is a block diagram illustrating both an exemplary in-order pipeline and an exemplary register renaming, out-of-order issue/execution pipeline according to some embodiments;

FIG. 13B is a block diagram illustrating both an exemplary embodiment of an in-order architecture core and an exemplary register renaming, out-of-order issue/execution architecture core to be included in a processor according to some embodiments;

FIGS. 14A-B illustrate a block diagram of a more specific exemplary in-order core architecture, which core would be one of several logic blocks (including other cores of the same type and/or different types) in a chip;

FIG. 14A is a block diagram of a single processor core, along with its connection to the on-die interconnect network and with its local subset of the Level 2 (L2) cache, according to some embodiments;

FIG. 14B is an expanded view of part of the processor core in FIG. 14A according to some embodiments;

FIG. 16 shown a block diagram of a system in accordance with some embodiments;

FIG. 17 is a block diagram of a first more specific exemplary system in accordance with some embodiment;

FIG. 18 is a block diagram of a second more specific exemplary system in accordance with some embodiments;

FIG. 19 is a block diagram of a System-on-a-Chip (SoC) in accordance with some embodiments; and FIG. 20 is a block diagram contrasting the use of a software instruction converter to convert binary instructions in a source instruction set to binary instructions in a target instruction set according to some embodiments.

DETAILED DESCRIPTION OF THE EMBODIMENTS

Figure 1:
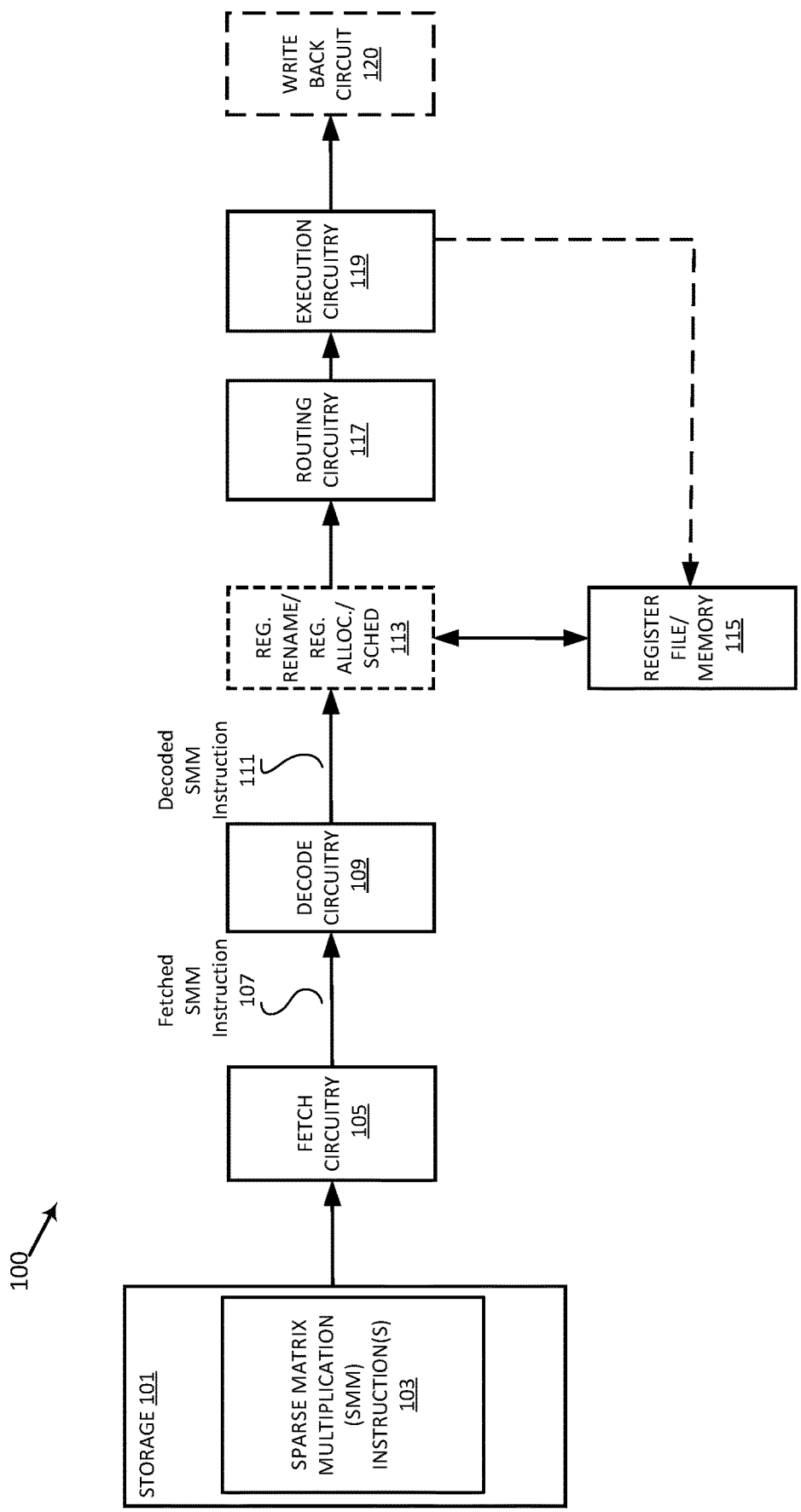
FIG. 1 is a block diagram illustrating processing components for executing a sparse matrix multiplication (SMM) instruction, according to an embodiment.

In the following description, numerous specific details are set forth. However, it is understood that some embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments if explicitly described.

Disclosed embodiments introduce a way to take advantage of the sparsity of a sparse input matrix to perform the matrix multiplication more efficiently, consuming less power while reducing the amount of cycles required to finish the calculation. Disclosed embodiments, unlike conventional, symmetric matrix multiplication circuits, are expected to improve matrix multiplication performance and power utilization by packing sparse matrices to avoid multiplying by zero. The packing, in some embodiments, entails folding a sparse matrix to replace zero-valued elements with non-zero elements. In other embodiments, the packing entails squeezing adjacent columns of a sparse matrix to similarly replace zero-valued elements with non-zero elements. In either case, when routing circuitry moves an element of a multiplicand matrix, it also routes the appropriate elements of the multiplier matrix in order to generate the result.

As used herein, "sparsity" of a matrix is defined as the proportion of non-zero elements, the remaining elements being zero or null. For example, disclosed embodiments, when performing a matrix multiplication involving a sparse matrix having a sparsity of 0.875 (with only ⅛th, or 12.5% of its elements having non-zero values), are expected to provide improved cost and performance by avoiding zero multiplications. In some embodiments, sparsity can be used to refer to the proportion of zero-valued elements.

In some embodiments, when processing matrix multiplication operations, a processor dynamically detects sparsity (detects zero-valued elements) in the input matrices. In some embodiments, the processor sets a bit to identify each zero-valued element. While the processor can analyze the data elements dynamically at run-time, in some embodiments, the input matrices can also be analyzed ahead-of-time, and the zero-valued elements marked. Based on the determined level of sparsity, and, if worthwhile to do so, the processor uses routing circuitry to pack the matrices into a "squeezed" or a "folded" format. The processor then uses routing circuitry to configure a processing core to process the packed matrix using fewer cycles or less hardware.

Figure 3:
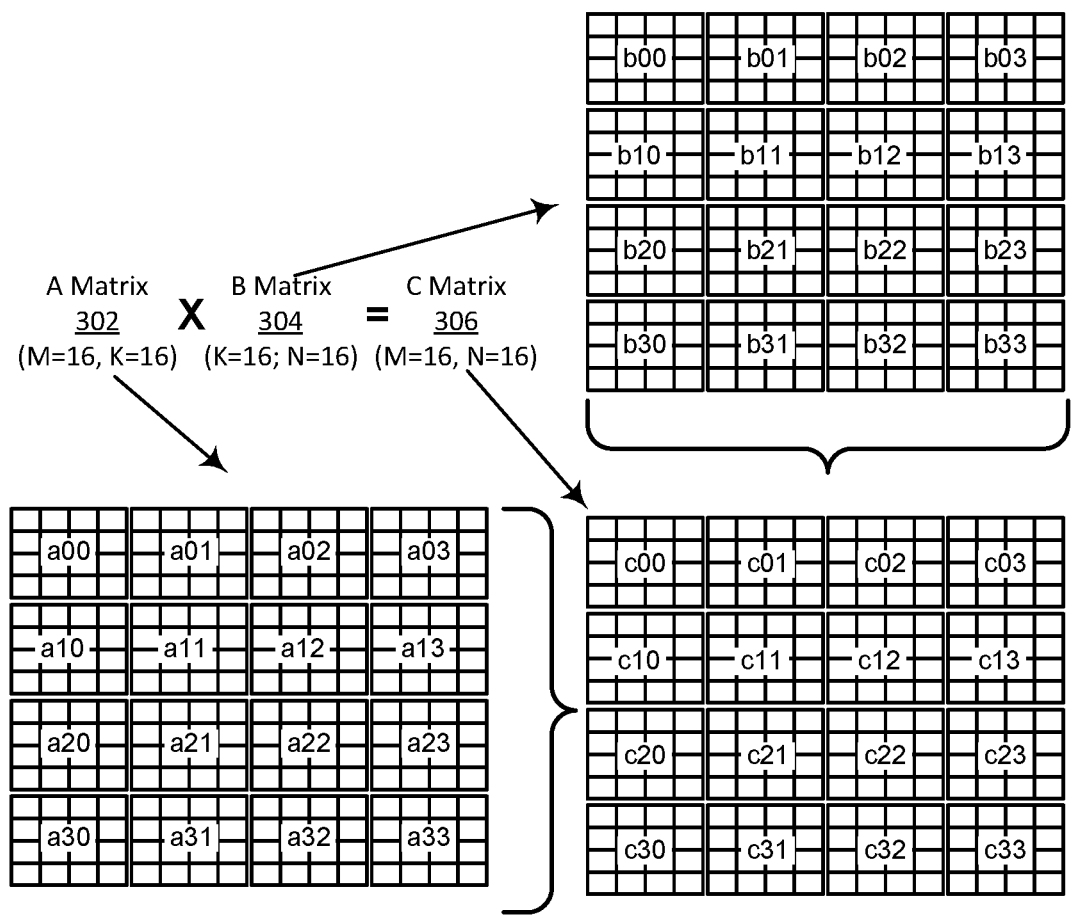
FIG. 3 is a block diagram of a processing array to execute a tiled sparse matrix multiplication (SMM) instruction, according to some embodiments.

In some embodiments, for example as illustrated and described with respect to FIG. 3, disclosed embodiments break the matrix multiplication into smaller matrices that can be executed with less hardware. For example, when multiplying an A matrix by a B matrix, if A and B are logically 512×512 matrices, disclosed embodiments break the calculation down into 32×32 submatrices.

Disclosed embodiments provide improved matrix multiplication for use in such applications as deep learning or machine learning.

Figure 5A:
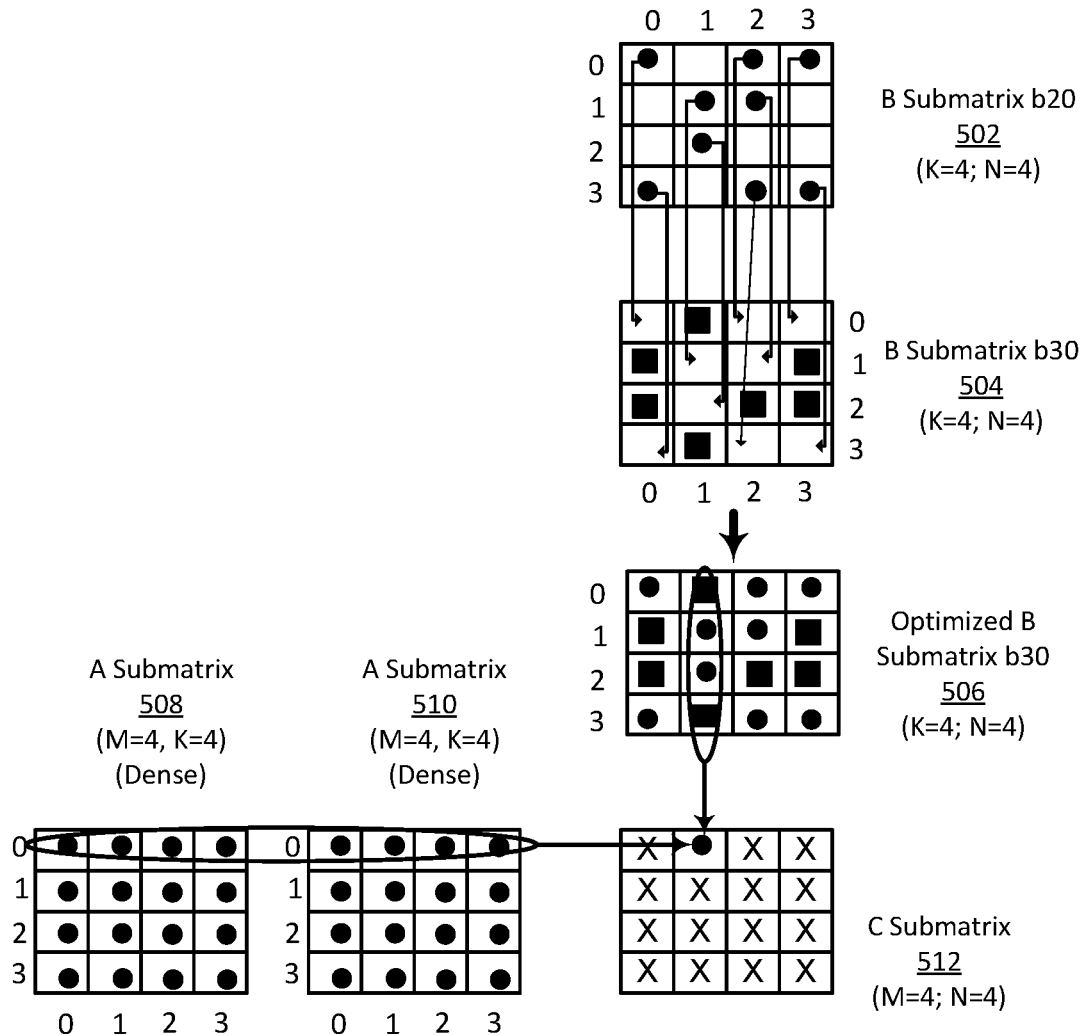
FIG. 5A is a block diagram illustrating matrix folding for a sparse matrix multiplication (SMM) instruction, according to some embodiments.
Figure 5B:
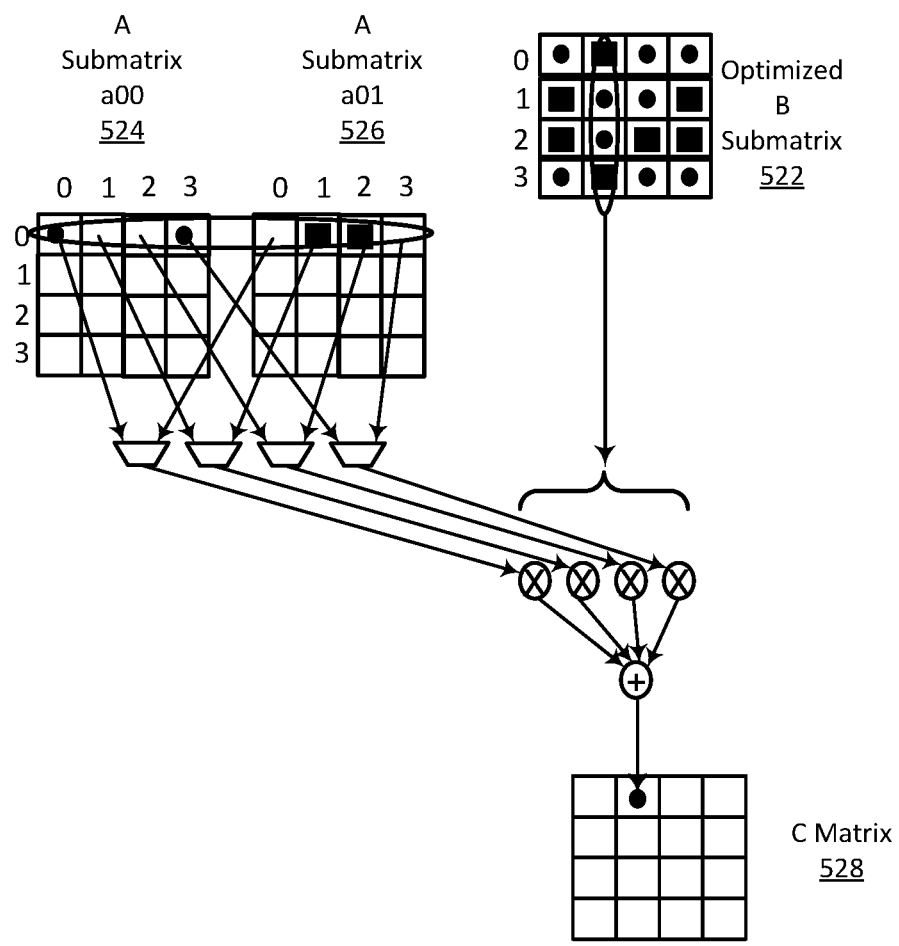
FIG. 5B is a block diagram illustrating a matrix multiplication with optimized folding opportunities, according to some embodiments.
Figure 5C:
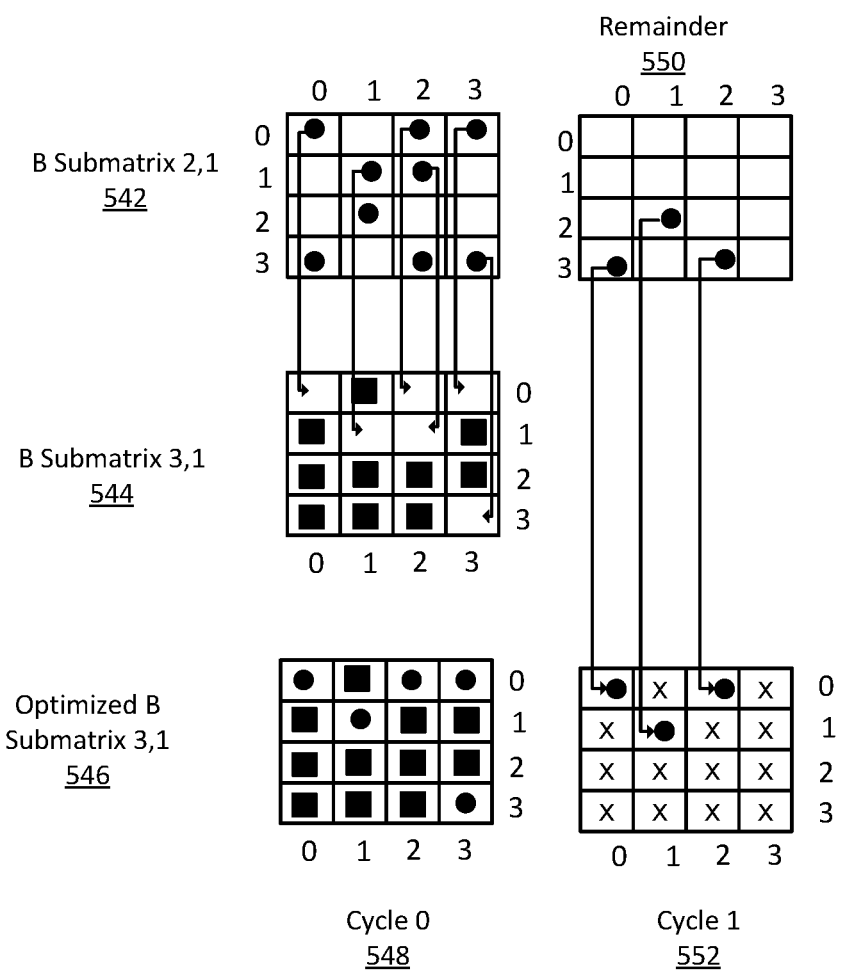
FIG. 5C is a block diagram illustrating increasing folding opportunities, according to some embodiments.

Some embodiments take advantage of a matrix sparsity by folding the sparse matrix, for example as illustrated and described with respect to FIGS. 5A-5C, or by squeezing the sparse matrix, for example as illustrated and described with respect to FIGS. 6A-6D.

Some previous solutions require sparsity in both matrices to be effective. Embodiments disclosed here, however, can provide speedup even if there is sparsity in only one matrix.

Disclosed embodiments are expected to improve cost and area by providing a single, reconfigurable execution circuit to support a variety of data formats—including both integer and floating point—in comparison to some approaches that rely on different circuits specializing in different data formats. Disclosed embodiments provide a matrix multiplication accelerator that supports both floating-point and integer data formats, with accumulation. The disclosed accelerator can also be optimized to operate on sparse matrices, by avoiding multiplying the zero elements. By combining these features into a reconfigurable circuit, disclosed embodiments thus enable a single matrix multiplication accelerator circuit to support multiple precision formats with wide accumulators, while efficiently reconfiguring for either dense or sparse matrices. The disclosed accelerator embodiments improve area and energy efficiency while providing flexibility to support many typical matrix multiplication workloads, such as machine learning.

In some embodiments, execution circuitry uses an inner product algorithm, by which the rows of the A matrix are loaded into a matrix multiplier processing unit (MMPU), and then the columns of the B matrix are streamed through one cycle at a time. Elements of the B matrix that are yet to be processed are sometimes referred to as "downstream" elements. This algorithm produces one column of the C matrix per cycle.

FIG. 1 is a block diagram illustrating processing components for executing a sparse matrix multiplication (SMM) instruction, according to some embodiments. As illustrated, storage 101 stores SMM instruction(s) 103 to be executed. As described further below, in some embodiments, computing system 100 is an SIMD processor to concurrently process multiple elements of packed-data vectors, such as matrices.

In operation, the SMM instruction 103 is fetched from storage 101 by fetch circuitry 105. The fetched SMM instruction 107 is decoded by decode circuitry 109. The SMM instruction format, which is further illustrated and described with respect to FIGS. 9, 10A-B, and 11A-D, has fields (not shown here) to specify first, second, and destination matrices, the specified second matrix in some embodiments being a sparse matrix with a density less than one (the density being the proportion of non-zero elements, i.e., the second matrix has at least some zero-valued elements). Decode circuitry 109 decodes the fetched SMM instruction 107 into one or more operations. In some embodiments, this decoding includes generating a plurality of micro-operations to be performed by execution circuitry (such as execution circuitry 119). The decode circuitry 109 also decodes instruction suffixes and prefixes (if used). Execution circuitry 119 is further described and illustrated below, at least with respect to FIGS. 2-8, 13A-B and 14A-B.

In some embodiments, register renaming, register allocation, and/or scheduling circuit 113 provides functionality for one or more of: 1) renaming logical operand values to physical operand values (e.g., a register alias table in some embodiments), 2) allocating status bits and flags to the decoded instruction, and 3) scheduling the decoded SMM instruction 111 for execution on execution circuitry 119 out of an instruction pool (e.g., using a reservation station in some embodiments).

Routing circuitry 117 assists the execution circuitry 119 by performing matrix folding (described and illustrated with reference to FIGS. 4 and 5A-C) and matrix squeezing (described and illustrated with reference to FIGS. 6A-D) to allow optimized matrix multiplication and reduction of zero-multiplications. In some embodiments, as shown, routing circuitry 117 is external to execution circuitry 119. In other embodiments, routing circuitry 117 is incorporated into and is part of execution circuitry 119.

Registers (register file) and/or memory 115 store data as operands of decoded SMM instruction 111 to be operated on by execution circuitry 119. Exemplary register types include writemask registers, packed data registers, general purpose registers, and floating point registers, as further described and illustrated below, at least with respect to FIG. 12.

In some embodiments, write back circuit 120 commits the result of the execution of the decoded SMM instruction 111. Execution circuitry 119 and system 100 are further illustrated and described with respect to FIGS. 2-8, 13A-B and 14A-B.

Figure 2:
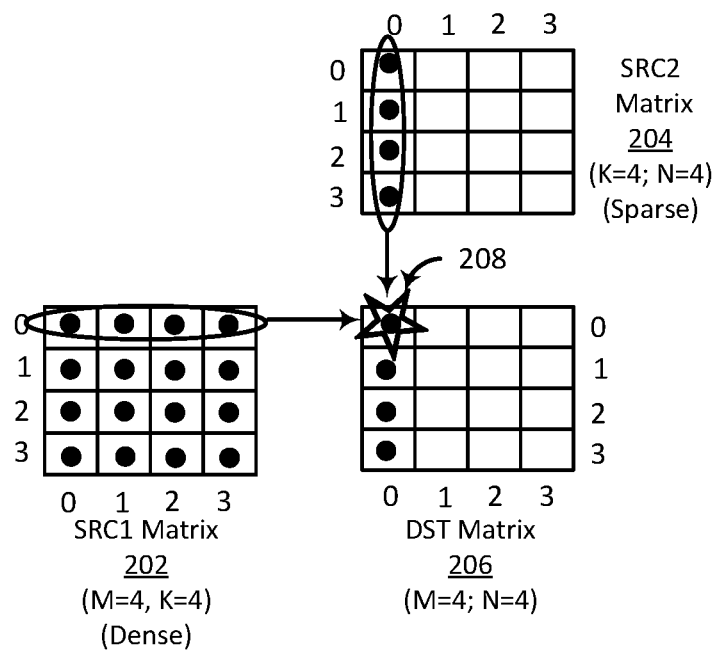
FIG. 2 illustrates exemplary execution flows to execute a sparse matrix multiplication (SMM) instruction, according to some embodiments.

FIG. 2 illustrates exemplary execution flows to execute a sparse matrix multiplication (SMM) instruction, according to some embodiments. As shown, SMM instruction 200 has fields to specify a destination matrix, a first source matrix, and a second source matrix, which are sometimes referred to as the C matrix, the A matrix, and the B matrix, respectively, or as the DST matrix, SRC1 matrix, and SRC2 matrix, respectively, or as the output matrix, the dense source matrix, and the sparse source matrix, respectively. When the second source matrix is a sparse matrix, it has a sparsity less than one (sparsity refers to the proportion of non-zero elements, which can be expressed as a percentage, a fraction, or a number between 0 and 1).

As shown, src1 matrix 202, src2 matrix 204, and dst matrix 206 have (M×K), (K×N), and (M×N) elements, respectively, where M=4, K=4, and N=4. Of course, in other embodiments, M, K, and N can vary. Dots are used to specify non-zero elements of the A, B, and C matrices, with A matrix 202 being a dense matrix and B matrix 204 being a sparse matrix.

In operation, a processor, in response to SMM instruction 200, is to multiply src1 matrix 202 by src2 matrix 204, to generate and store a product in dst matrix 206. For example, the processor is to compute the top leftmost element, labeled as 208, of dst matrix 206 (a.k.a. the C matrix, the output, or the product) by multiplying elements in the top row of src1 matrix 202 (a.k.a. the A matrix, the dense matrix, the multiplier, or a factor) with corresponding elements in the leftmost column of src2 matrix 204 (a.k.a. the B matrix, the sparse matrix, the multiplicand, or a factor). As used herein, the term "corresponding" means that the relative position of the element of the A matrix is the same relative position within the row being multiplied as the element in the column of the B matrix being multiplied. To illustrate the beginning part of the operation, the result 208 stored at row 0, column 0 of C matrix 206 is generated by multiplying and accumulating corresponding non-zero elements of src1 matrix 202 (a.k.a., A matrix) row 0 and src2 matrix 204 (a.k.a., B matrix) column 0. Stated algebraically, Cr0c0=Ar0c0*Br0c0+Ar0c1*Br1c0+Ar0c2*Br2c0+Ar0c3*Br3c0. The remaining non-zero products of column 0 of dst matrix 206 are generated similarly. The elements of columns 1, 2, and 3 of C matrix 206 are all zero because columns 1, 2, and 3 of src2 matrix 204 are all zero. In some embodiments, the generated products are accumulated with previous contents of dst matrix 206. Execution of the SMM instruction by disclosed embodiments is further illustrated and described with respect to FIGS. 3-8, 13A-B, and 14A-B.

Tiled Matrix Multiplication

FIG. 3 is a block diagram of a processing array to execute a tiled sparse matrix multiplication (SMM) instruction, according to some embodiments. As shown, A matrix 302 and B matrix 304 are 16×16 matrices, which are to be multiplied to generate C matrix 306, also a 16×16 matrix.

In some embodiments, as shown, a large matrix multiplication is performed by breaking the operands down to smaller matrices. Here, the 16×16 matrices are broken down into smaller, 4×4 matrices. To calculate submatrix c00, for example, sub-matrices a00 and b00 are multiplied first using a 4×4 array of processing units, then accumulated on top of the first result are the results of submatrix multiplications a01*b10, a02*b20 and a03*b30.

If each of the 4×4 multiplications is performed in one cycle, it would therefore take four cycles to finish the calculation of submatrix c11. As further described and illustrated with respect to FIGS. 5-7, some disclosed embodiments use a "folding" concept to speed up and improve the efficiency of the calculation without increasing the number of multipliers. For example, if matrices b00, b10 and/or b20 are sparse matrices, disclosed embodiments avoid using hardware resources to multiply zero elements, and instead apply the multipliers to performing useful work by "folding over" elements from submatrix b30 to make use of those multipliers. If all elements of submatrix b30 can be folded over, disclosed embodiments allow execution to speed up by skipping the a03×b30 multiplication altogether.

Matrix Folding

Figure 4:
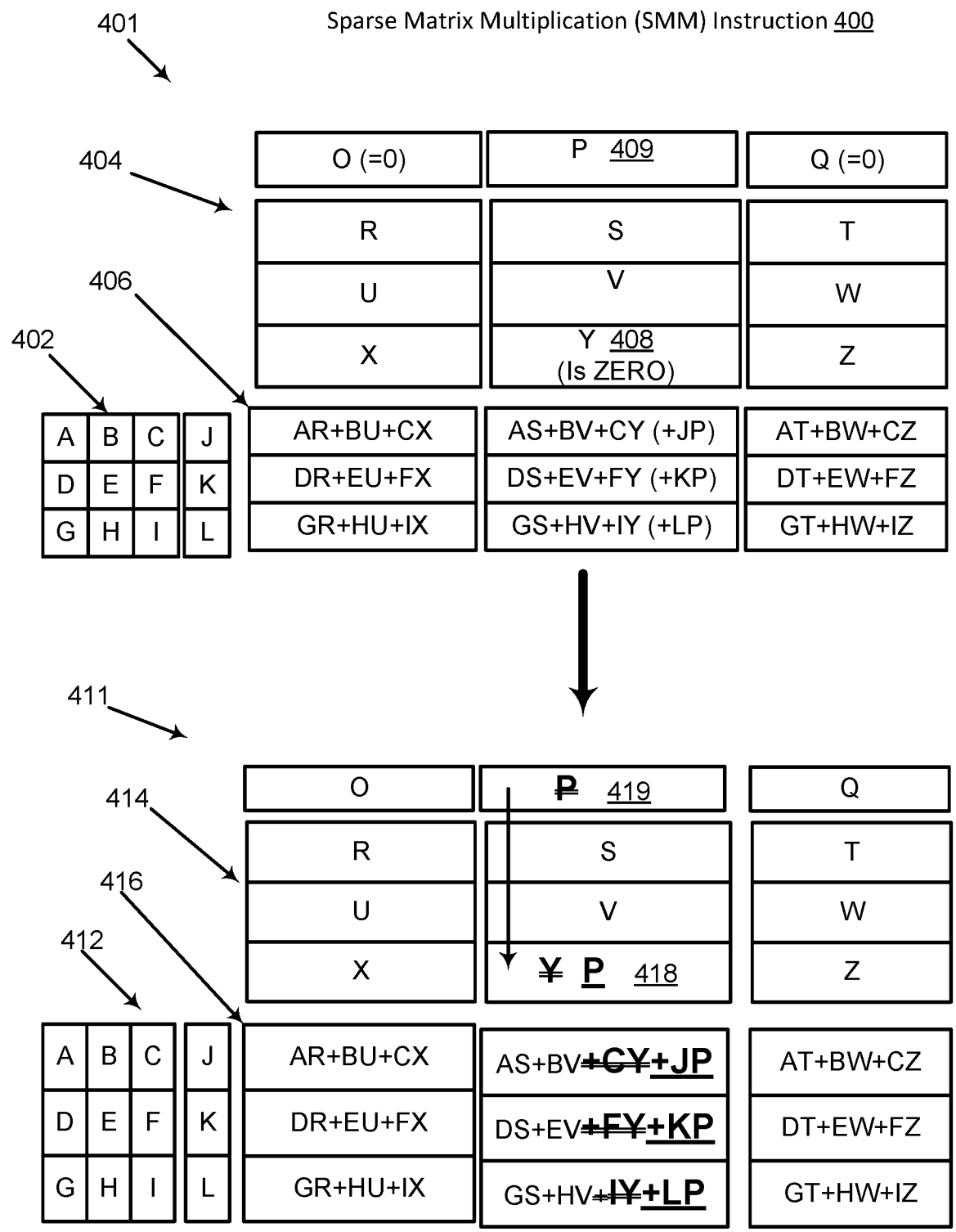
FIG. 4 is a block diagram illustrating matrix folding for a sparse matrix multiplication (SMM) instruction, according to some embodiments.

FIG. 4 is a block diagram illustrating another optimized execution of a sparse matrix multiplication (SMM) instruction, according to some embodiments. To illustrate the optimization, SMM instruction 400 is shown being executed in both non-optimized mode 401 and optimized mode 411. As shown, during non-optimized matrix multiplication 401, dense source matrix 402 (a.k.a., A matrix) is to be multiplied by sparse source matrix 404 (a.k.a., B matrix) to generate output matrix 406 (a.k.a., C matrix).

Dense source matrix 402 is a 3×3 matrix having nine non-zero elements, labeled as A at location (0,0) to I at location (2,2). Sparse source matrix 404 is also a 3×3 matrix, and has elements labeled as R, at location (0,0), to Z, at location (2,2). In the illustrated embodiment, the A matrix 402 is a submatrix of a logically larger matrix, and a next column is shown with elements labeled J, K, and L. Similarly, the illustrated B matrix 404 is a submatrix of a logically larger matrix, and a next row is shown with elements labeled O, P, and Q.

Sparse source matrix 404, however, has a zero-valued element, Y 408, which would result in three zero-multiplications in the non-optimized mode to generate products CY, FY, and IY (to optimize the multiplication, routing circuitry, as described below, can take advantage of an opportunity to move element 409 to use the multiplication resources that would otherwise be used for the zero multiplication involving zero-valued element 408).

It should be noted that, while FIG. 4 illustrates 409 being moved from a next submatrix, in operation, elements from the same submatrix, for example elements V or S, can be moved.

The elements of output matrix 406 are shown algebraically. For example, the element at location (0,0) of C matrix 406 is "AR+BU+CX." In non-optimized mode 401, the elements of the middle column of output matrix 406 would include zero-valued products, C*Y, F*Y, and I*Y.

In the optimized version of the operation 411, the A, B, and C matrices are labeled as 412, 414, and 416, respectively. This time, consistent with some embodiments, routing circuitry moves the item, P 419, to location 418, previously occupied by the zero-valued element, Y.

As optimized, execution hardware is no longer used to multiply by zero. Rather, those multipliers are used to generate useful products, JP, KP, and LP. In the optimized mode, as shown, the multipliers that would be used to generate the products, CY, FY, and IY, in the non-optimized mode are now used to generate useful, non-zero products, JP, KP, and LP. To implement the optimization, the would-be zero-valued products, CY, FY, and IY are no longer generated. Instead, useful (i.e., non-zero) products, JP, KP, and LP, are generated, and, as shown, are accumulated with the products generated in the second column of C matrix 416. In operation, another element can be moved into the spot vacated by element 419.

FIG. 5A is a block diagram illustrating matrix folding for a sparse matrix multiplication (SMM) instruction, according to some embodiments. As shown, B submatrix b20 (i.e., in a second row and zeroth column of a larger, logical array) is labeled as 502 and is a 4×4 sparse matrix containing nine (9) non-zero elements, represented by circles. B submatrix b30 (i.e., at a third row, zeroth column of a larger, logical array) is labeled as 504 and is a 4×4 sparse matrix having seven (7) non-zero-elements, represented by squares.

To optimize execution of SMM instruction 500, similarly to the disclosed embodiment of FIG. 4, one or more non-zero elements of B submatrix b20, labeled as 502, are moved into zero-valued elements of B submatrix b30, labeled as 504. When elements are moved as described, it is sometimes referred to as "folding" the elements of one submatrix over another submatrix. After optimization, optimized B submatrix b30, labeled as 506, includes a chunk of nine (9) non-zero elements from B submatrix b20 having been "folded" over into it. C submatrix 512 is calculated by multiplying A submatrices 508 and 510 by appropriate elements of optimized B submatrix 506. For the sake of simplicity, only the element of C submatrix 512 at location (0, 1) is shown, the other elements being shown as "X," i.e., don't care.

The submatrix "folding" concept involves the observation that if Matrix B is sparse (has many values as zeros), the unoptimized matrix multiplication would include multiple, useless zero multiplications. According to disclosed embodiments, therefore, one sparse submatrix (e.g., B submatrix b20, labeled as 502) is folded over another sparse submatrix (e.g., B submatrix b30, labeled as 304). To the extent that the folding moves multiple elements, it is sometimes referred to as folding a "chunk" of elements.

The embodiment disclosed in FIG. 5A, by avoiding use of any of the zero-valued elements of B submatrix b20 502 and of B submatrix b30 504, therefore avoids multiplying by zeroes, which would uselessly use multiplication hardware while contribute nothing to the final results. As shown, the zero-valued elements of B submatrix b30 504 are overwritten with non-zero elements from a vertically adjacent B submatrix b20 502. Despite the folding, the final result of each element in C matrix 510 is a sum of products of the entire columns of all submatrices of A with B. In some embodiments, an entire submatrix is folded on top of another, allowing the processor to skip over multiplying the now entirely zero-valued submatrix, thereby accelerating and reducing power utilization of the overall computation.

FIG. 5A depicts a folding that managed to find an empty (i.e., zero-valued) space in B submatrix b30 504 for every non-zero element of B submatrix b20 502. This might not always be the case, as non-zero elements appear at random indices. In that case, FIGS. 5B and 5C describe two embodiments to increase the folding opportunities.

A first embodiment to increase folding opportunities is illustrated in FIG. 5B, which is a block diagram illustrating a matrix multiplication with optimized folding opportunities, according to some embodiments. As shown, optimized B submatrix 522 includes all non-zero elements. Focusing on column 1 of the optimized B submatrix 522, the column consists of two types of elements, one represented by a circle and the other represented by a square. A submatrix a00, labeled as 524, includes non-zero elements represented by circles, which are to be multiplied by appropriate elements of B submatrix 522 to generate corresponding elements of C matrix 528, of which only one element is shown. A submatrix a01, labeled as 526, includes non-zero elements represented by squares, which are to be multiplied by appropriate elements of optimized B submatrix 522 to generate corresponding elements of C matrix 528, of which only one element is shown. By providing multiplexers to select among the elements of submatrices a00 524 and a01 526, the embodiment of FIG. 5B thus increases opportunities to fold elements in the B matrix 522. Increasing the level of multiplexing increases the range from which elements of the B matrix can be selected and folded down vertically. In other embodiments, not shown, even wider multiplexers are provided to select among an even wider set of A submatrix elements.

A second embodiment to increase folding opportunities is illustrated in FIG. 5C, which is a block diagram illustrating increasing folding opportunities, according to some embodiments. As shown, the embodiment illustrated in FIG. 5C increases folding opportunities by trying to fold over multiple cycles, while remembering the "remainder" after each cycle. The remainder refers to the elements that could not be folded in a cycle. As shown, SMM instruction 540 calls for performing a multiplication with a sparse B submatrix as a factor. Non-optimized B submatrix 2,1, labeled as 542, includes nine non-zero elements, represented by circles, which are to be folded into B submatrix 3,1, labeled as 544, which includes six zero-valued elements. In a first cycle, cycle 0 548, optimized B submatrix 3,1, labeled as 546, is formed by folding into it six non-zero elements from B submatrix 2,1 542. The remainder 550, consisting of the three non-zero elements of B submatrix 2,1 542 that did not get folded during the first cycle, are folded into optimized B matrix 3,1 546 during a second cycle, cycle 1 552.

The folding optimizations illustrated in FIGS. 5A-C can be repeated until every non-zero element in a B matrix is folded over, at which point that B submatrix can be skipped altogether, reducing power utilization and increasing performance.

Matrix Squeezing

Figure 6A:
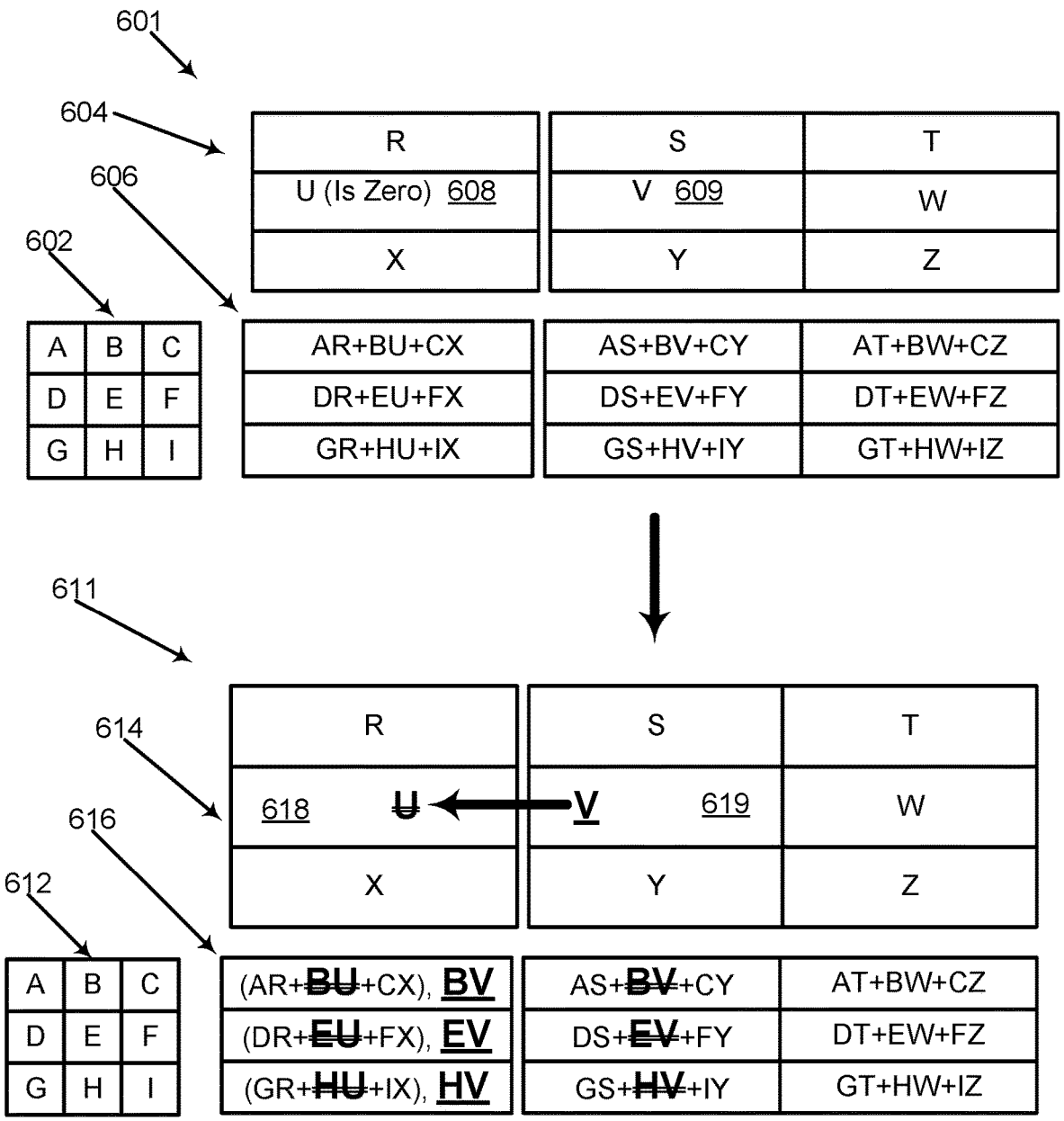
FIG. 6A is a block diagram illustrating matrix squeezing for a sparse matrix multiplication (SMM) instruction, according to some embodiments.

FIG. 6A is a block diagram illustrating optimized execution of a sparse matrix multiplication (SMM) instruction, according to some embodiments. To illustrate an optimization according to some embodiments, SMM instruction 600 is shown being executed in both non-optimized mode 601 and optimized mode 611. Dense source matrix 602 is a 3×3 matrix having nine non-zero elements, labeled as A at location (0,0) to I at location (2,2). Sparse source matrix 604 is also a 3×3 matrix, and has elements labeled as R at location (0,0) to Z at location (2,2). Sparse source matrix 604, however, has a zero-valued element, U 608, which would result in a zero-multiplication in the non-optimized mode. The elements of output matrix 606 are shown algebraically. For example, the element at location (0,0) of C matrix 606 is "AR+BU+CX." In non-optimized mode 601, the elements of the leftmost column of output matrix 606 would include zero-valued products, B*U, E*U, and H*U.

During non-optimized matrix multiplication 601, dense source matrix 602 (a.k.a., A matrix) is to be multiplied by sparse source matrix 604 (a.k.a., B matrix) to generate output matrix 606 (a.k.a., C matrix), one column at a time. The non-optimized matrix multiplication 602 includes three zero-multiplications to generate products BU, EU, and HU. The non-optimized operation takes three cycles.

To optimize the multiplication according to disclosed embodiments, however, routing circuitry, as described below, takes advantage of an opportunity to move element 609 to use the multiplication resources that would otherwise be used for the zero multiplication involving zero-valued element 608. In operation, another element can be moved into the spot vacated by element 619.

When all of the elements in a column of sparse source matrix 604 are moved, execution skips over the now-empty column. The optimized mode, then, would take at least one fewer clock cycle to perform the multiplication.

In the optimized version of the operation 611, the A, B, and C matrices are labeled as 612, 614, and 616, respectively. This time, consistent with some embodiments, routing circuitry moves the item, "V," from location (1,1), labeled 619, to location (1,0), labeled as 618.

As optimized, execution hardware is no longer used to multiply by zero. Rather, those multipliers are used to generate useful products, BV, EV, and HV. In the optimized mode, as shown, the multipliers that would be used to generate BU, EU, and HU in the non-optimized mode are now used to generate useful, non-zero products, BV, EV, and HV. To implement the optimization, the would-be zero-valued products, BU, EU, and HU are no longer generated. Instead, useful (i.e., non-zero) products BV, EV, and HV are generated, and are accumulated with the products generated in the second column of C matrix 616, where those elements were to be generated in non-optimized mode.

Figure 6B:
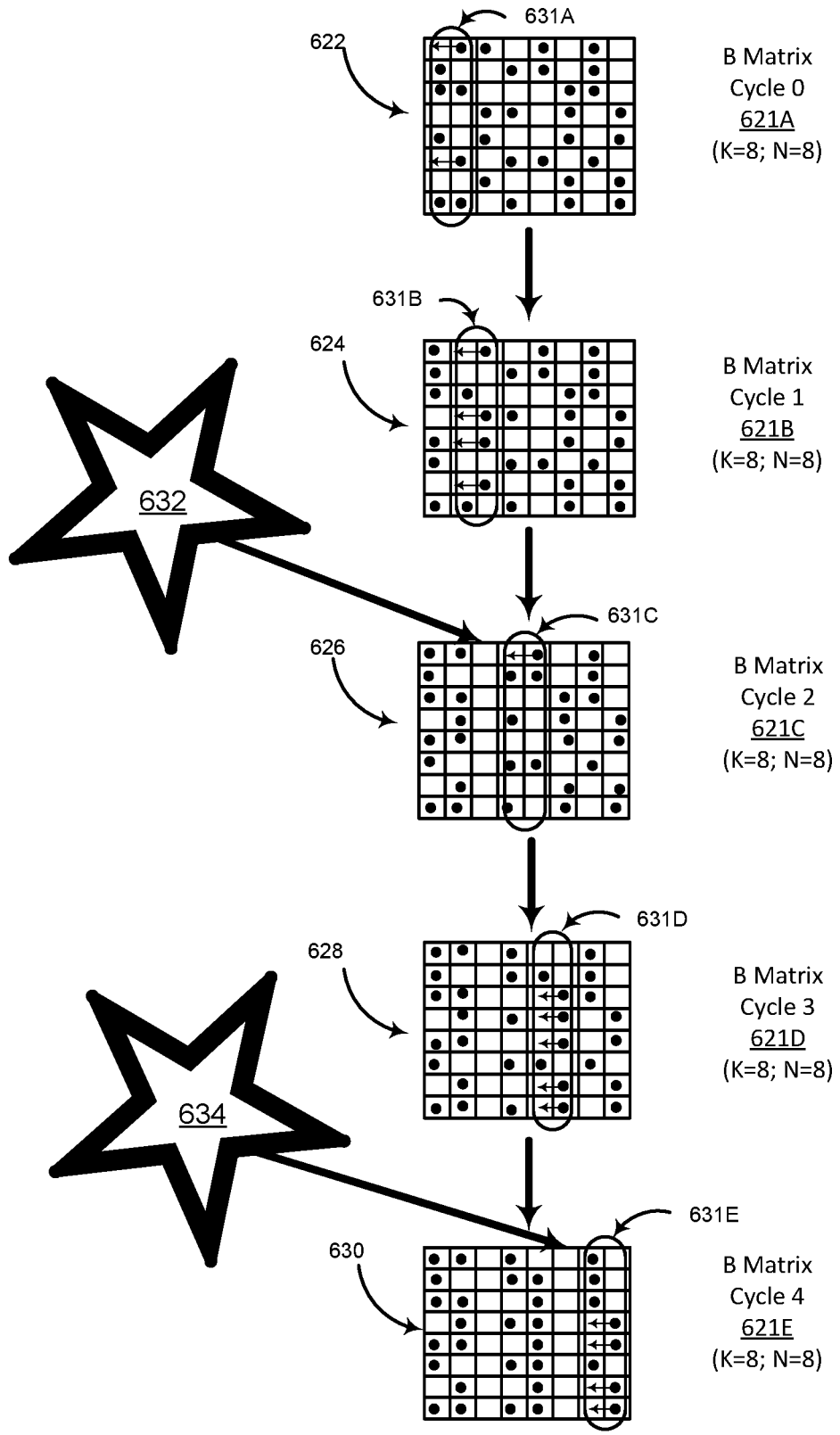
FIG. 6B is a block flow diagram illustrating matrix squeezing by a processor executing a sparse matrix multiplication (SMM), according to some embodiments.

FIG. 6B is a block flow diagram illustrating matrix squeezing by a processor executing a sparse matrix multiplication (SMM) instruction, according to some embodiments. As shown, routing and execution circuitry, for example as illustrated and described with respect to FIGS. 1-8, 13A-B and 14A-B, is to execute SMM instruction 620 over five cycles. Illustrated is a portion of that execution, namely, the processing of the 8×8 B matrix being shown over the five cycles, and labeled as B matrix cycle 0-4, 621A-E. Five snapshots of the B matrix are shown as 622-630.

Without optimization, assuming one column of the B matrix is processed per cycle, it would take 8 cycles to process the B matrix. The illustrated embodiment, however, optimizes the execution by taking advantage of opportunities to squeeze non-zero elements into adjacent zero-valued slots.

The illustrated embodiment, in operation, uses a pairwise column "squeeze window" to move non-zero elements, where possible, to adjacent zero-valued slots. The pairwise squeeze window is a sliding window approach, and any elements that were not "squeezable" are carried over to the next iteration (as shown in the example). An optimization opportunity arises each time a column of all zeros is encountered; the squeeze window can skip that column altogether, thereby improving performance and decreasing power utilization. In some embodiments, not shown, the squeeze window is wider than shown. In some embodiments, for example as illustrated and described with respect to FIGS. 6C-D, a non-zero element identified in the squeeze window can move to an available zero-valued slot that is nearby, according to specified movement rules. In the embodiment of FIGS. 6A-B, an element may only move only horizontally, from the right to the left, within the window size. As will be shown with respect to FIGS. 6C-D, in some embodiments, an element may move horizontally, from the right to the left column, and may also move up or down one spot, thereby increasing the opportunities to move elements. The embodiment of FIG. 6C thereby exhibits a "window pane width," labeled as 643, of 3 elements. In other embodiments, a window pane width can be different.

Returning to the discussion of FIG. 6B, in cycle 0, as illustrated by snapshot 622, routing circuitry analyzes a pairwise window 631A on the first two columns of B matrix 621A to identify and move two non-zero elements, at locations (0,1) and (5,1), to adjacent zero-valued slots, thereby generating a partially optimized B matrix 621B.

Note that, even as optimized, B matrix 521B still contains zero-valued elements at locations (3,0) and (6,0) of the first column. In embodiments with increased routing opportunities, for example as illustrated and described with respect to FIG. 6C, locations (3,0) and (6,0) of the first column are filled with non-zero elements, zero-multiplications are avoided, performance is improved by eliminating one cycle, and power consumption is reduced. In some embodiments, the zero-valued elements of column zero of B matrix 521B are identified and the zero-multiplication is avoided. In other embodiments, the zero-multiplication is allowed to proceed.

In cycle 1, as illustrated by snapshot 624, routing circuitry analyzes a pairwise window 631B on the next two columns of B matrix 621B to identify and move four non-zero elements, from locations (0,2), (3,2), (4,2), and (6.2), to adjacent zero-valued slots, thereby generating a partially optimized B matrix 621C.

An optimization opportunity 632 exists in optimized B matrix 621C. Namely, column 2 of the optimized B matrix 621C does not include any non-zero elements and can therefore be skipped over to improve performance by once cycle and to reduce power consumption. In cycle 2, then, as illustrated by snapshot 626, the pairwise squeeze window 631C has skipped column 2 of the B matrix, and now spans over columns three to four. Routing circuitry analyzes the pairwise window 631C on columns three to four of B matrix 621C to identify and move one non-zero element from location (0,4) to an adjacent zero-valued slot, thereby generating a partially optimized B matrix 621D.

In cycle 3, as illustrated by snapshot 628, the pairwise squeeze window 631D shifted by one element to now analyze columns 4-5 of the B matrix 621D. Routing circuitry analyzes the pairwise window 631D on columns four to five of B matrix 621D to identify and move five non-zero elements, from locations (2,5), (3,5), (4,5), (6,5), and (7,5), to adjacent zero-valued slots, thereby generating partially optimized B matrix 621E.

Another optimization opportunity 634 exists in optimized B matrix 621E. Namely, column 5 of the optimized B matrix 621E does not include any non-zero elements and can therefore be skipped over to improve performance and to reduce power utilization. In cycle 4, then, as illustrated by snapshot 630, the pairwise squeeze window 631E has skipped column 5 of the B matrix, and now spans over columns six to seven. Routing circuitry analyzes the pairwise window 631E on columns six to seven of B matrix 621E to identify and move four non-zero elements, from locations (3,7), (4,7), (6,7), and (7,7), to adjacent zero-valued slots, thereby creating another all-zero column, column 7, which can be skipped over to optimize power and performance.

Figure 6C:
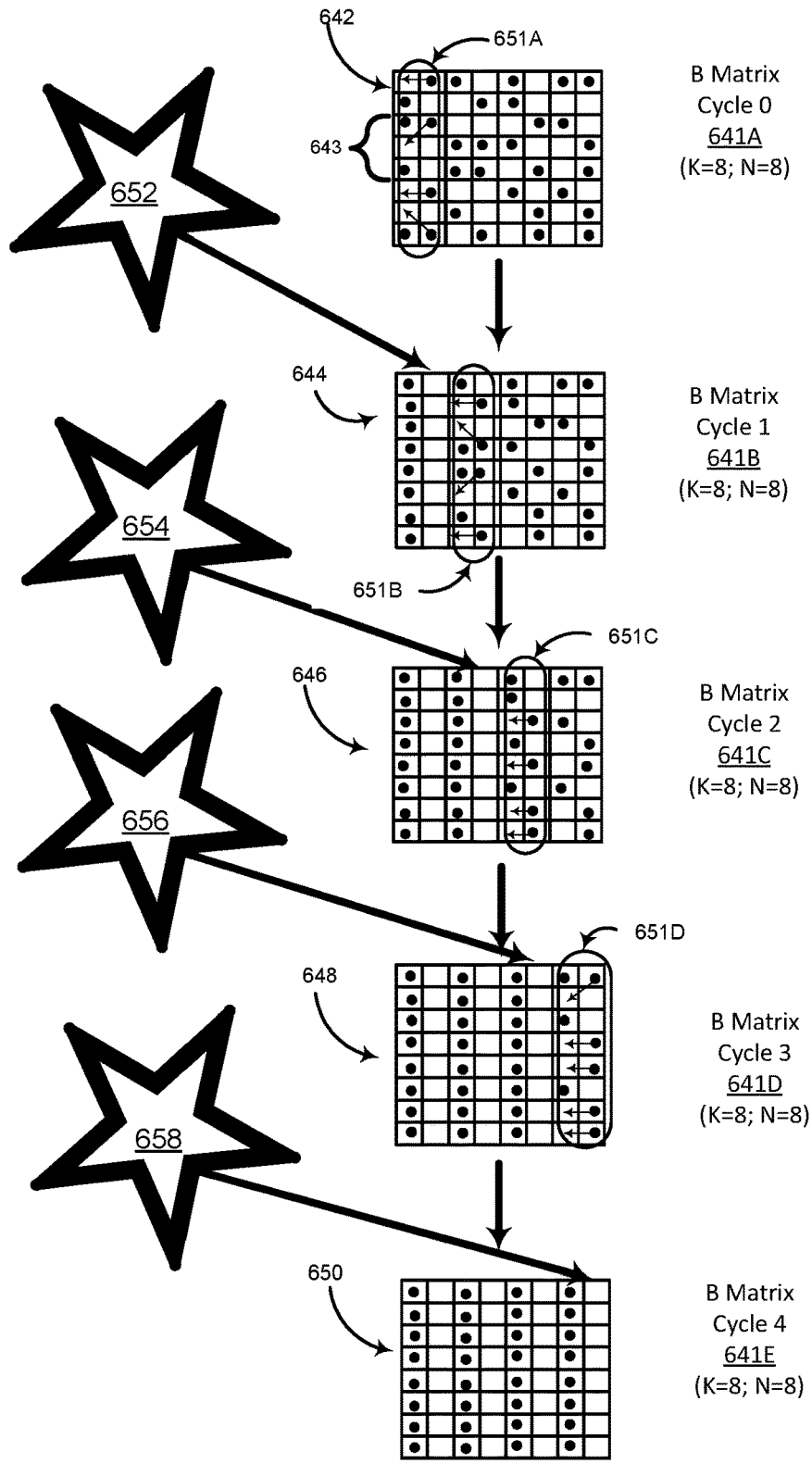
FIG. 6C is another block flow diagram illustrating matrix squeezing by a processor executing a sparse matrix multiplication (SMM), according to some embodiments.

FIG. 6C is another block flow diagram illustrating matrix squeezing by a processor executing a sparse matrix multiplication (SMM) instruction, according to some embodiments. As shown, routing and execution circuitry, for example as illustrated and described with respect to FIGS. 1-5C, 7-8, 13A-B and 14A-B, is to execute SMM instruction 640 over five cycles. Illustrated is a portion of that execution, namely, the processing of the 8×8 B matrix being shown over the five cycles, and labeled as B matrix cycle 0-4, 641A-E. Five snapshots of the B matrix are shown and labeled as 642, 644, 646, 648, and 650.

Without optimization, assuming one column of the B matrix is processed per cycle, it would take 8 cycles to process the B matrix. The illustrated embodiment, however, optimizes the execution by using routing circuitry to take advantage of opportunities to squeeze non-zero elements into nearby zero-valued slots.

The illustrated embodiment, in operation, uses a pairwise column "squeeze window" to move non-zero elements, where possible, to nearby zero-valued slots. The pairwise squeeze window is a sliding window approach, and any elements that were not "squeezable" are carried over to the next iteration (as shown in the example). An optimization opportunity arises each time a column of all zeros is encountered; the squeeze window can skip that column. Here, four such opportunities are labeled as 652, 654, 656, and 658.

In cycle 0, as illustrated by snapshot 642, routing circuitry analyzes pairwise window 651A on the first two columns of B matrix 641A to identify and move four non-zero elements from locations (0,1), (2,1), (5,1), and (7,1), to nearby zero-valued slots, thereby generating a partially optimized B matrix 641B.

Note that according to the embodiment illustrated in FIG. 6B, the elements were only allowed to move horizontally, so the elements at locations (2,1) and (7,1) would not have moved in cycle 0. The embodiment of FIG. 6C, however, has a wider "window pane size" of 3 elements, an example of which is labeled as 643. With the wider window pane size, the elements at locations (2,1) and (7,1) are able to move in cycle 0. In other embodiments, not shown, the window pane size is different, be it larger or smaller.

Figure 6D:
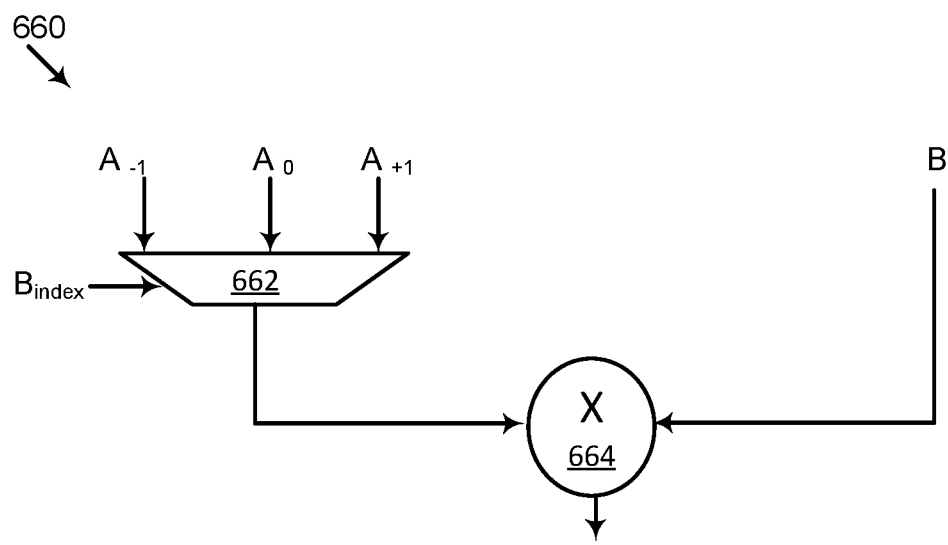
FIG. 6D is a block diagram illustrating a circuit used in implementing matrix squeezing for a sparse matrix multiplication (SMM) instruction, according to some embodiments.

Note that some of the non-zero elements that moved in cycle 0 moved to diagonally adjacent zero-valued slots. To allow such a move, circuitry such as that shown in FIG. 6D is used to route the proper corresponding element of the A matrix to be multiplied with the B matrix element that was moved. In other embodiments, for example when the window pane size is larger than three, multiplexor 662 (FIG. 6D) has additional A elements as inputs.

An optimization opportunity 652 exists in optimized B matrix 641B. Namely, column 1 of the optimized B matrix 641B does not include any non-zero elements and can therefore be skipped over to improve performance and to reduce power consumption. In cycle 1, then, as illustrated by snapshot 644, the pairwise squeeze window 651B has skipped column 1 of the B matrix, and now spans over columns two to three. Routing circuitry analyzes the pairwise window 651B on columns two to three of B matrix 641B to identify and move four non-zero elements, from locations (1, 3), (3,3), (4,3), and (7,3) to nearby zero-valued slots, thereby generating a partially optimized B matrix 641C.

Another optimization opportunity 654 exists in optimized B matrix 641C. Namely, column 3 of the optimized B matrix 641C does not include any non-zero elements and can therefore be skipped over to improve performance and to reduce power consumption. In cycle 2, then, as illustrated by snapshot 646, the pairwise squeeze window 651C has skipped column 3 of the B matrix, and now spans over columns four to five. Routing circuitry analyzes the pairwise window 651C on columns four to five of B matrix 641C to identify and move four non-zero elements, from locations (2, 5), (4, 5), (6, 5), and (7, 5) to nearby zero-valued slots, thereby generating a partially optimized B matrix 641D.

Another optimization opportunity 656 exists in optimized B matrix 641D. Namely, column 5 of the optimized B matrix 641D does not include any non-zero elements and can therefore be skipped over to improve performance and to reduce power consumption. In cycle 3, then, the pairwise squeeze window 651D has skipped column 5 of the B matrix, and now spans over columns six to seven. Routing circuitry analyzes a pairwise window 651D on columns six to seven of B matrix 641D to identify and move five non-zero elements, from locations (0,7), (3,7), (4,7), (6,7), and (7,7), to nearby zero-valued slots, thereby generating a partially optimized B matrix 641E.

Another optimization opportunity 658 exists in optimized B matrix 641E. Namely, column 7 of the optimized B matrix 641E does not include any non-zero elements and can therefore be skipped over to improve performance and to reduce power utilization. In cycle 4, then, as illustrated by snapshot 650, there are no remaining columns of optimized B matrix 641E to process.

FIG. 6D is a block diagram illustrating a circuit to assist in matrix squeezing for a sparse matrix multiplication (SMM) instruction, according to some embodiments. Circuit 660 can be used to enable more optimization opportunities during a squeeze operation, as illustrated and described with respect to FIGS. 6A-B. Namely, circuit 660 allows a B matrix element to move diagonally, lining up the appropriate corresponding element of the A matrix to multiply. As shown, circuit 660 includes multiplexer 662 to route any one of three A matrix elements to multiplier 664 to be used in implementing a sparse matrix multiplication (SMM) instruction. In other embodiments, not shown, optimization opportunities are further increased by allowing selection of more A matrix elements. For example, an 8-to-1 multiplexer can be used, thereby allowing the B element to move to any one of eight available zero-valued slots.

Multiply-Accumulate Circuitry

Figure 7:
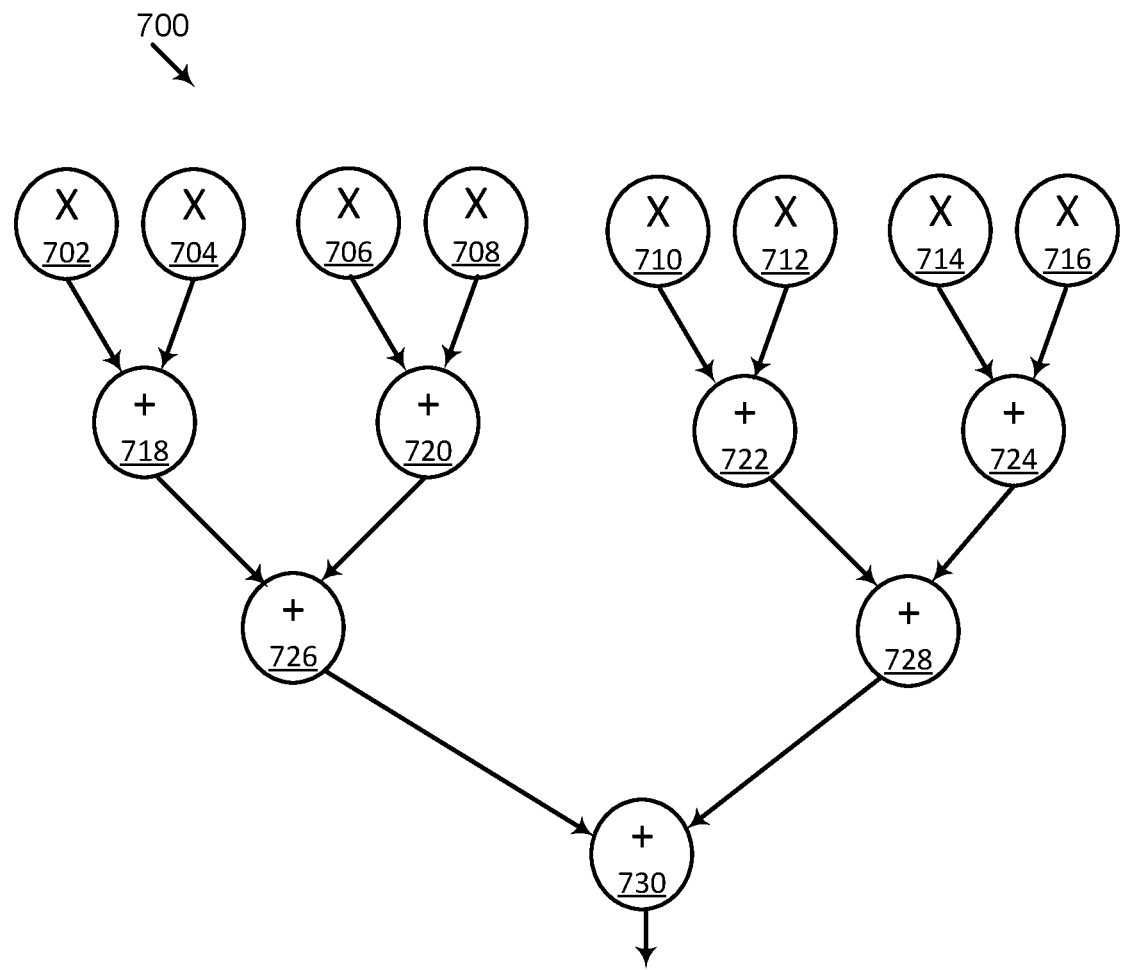
FIG. 7 is a block diagram illustrating a multiply-accumulate circuit for a sparse matrix multiplication (SMM) instruction, according to some embodiments.

FIG. 7 is a block diagram illustrating a multiply-accumulate (MAC) circuit for a sparse matrix multiplication (SMM) instruction, according to some embodiments. As shown, MAC circuit 700 includes eight multipliers, 702-716, followed by a binary tree of seven two-input adders 718-730. In some embodiments, the result from adder 730 is accumulated with a previous value of a destination. In other embodiments, wider adders and/or multipliers are used.

When used by execution circuitry to implement a sparse matrix multiplication (SMM) instruction, for example as illustrated and described with respect to FIGS. 1-6D, a multiplexer (not shown) at the input of each of multipliers 702-716 selects an element from the A matrix that matches with the corresponding element of the B matrix being multiplied according to the algorithm. Further, when used with execution circuitry to implement the sparse matrix multiplication (SMM), the output of adder 730 is routed to be accumulated with the appropriate output matrix element, according to the algorithm.

Of course, it should be noted that when a sparse matrix is folded or squeezed, for example as illustrated and described with respect to FIGS. 4-6D, multiplexers 702-716 select from additional A matrix elements. Similarly, when a folded element is used to generate a product, a different adder than adder 730 will be needed to accumulate that product with the appropriate element of the destination matrix (a.k.a. C matrix).

Exemplary Method of Accelerating Sparse Matrix Multiplication

Figure 8:
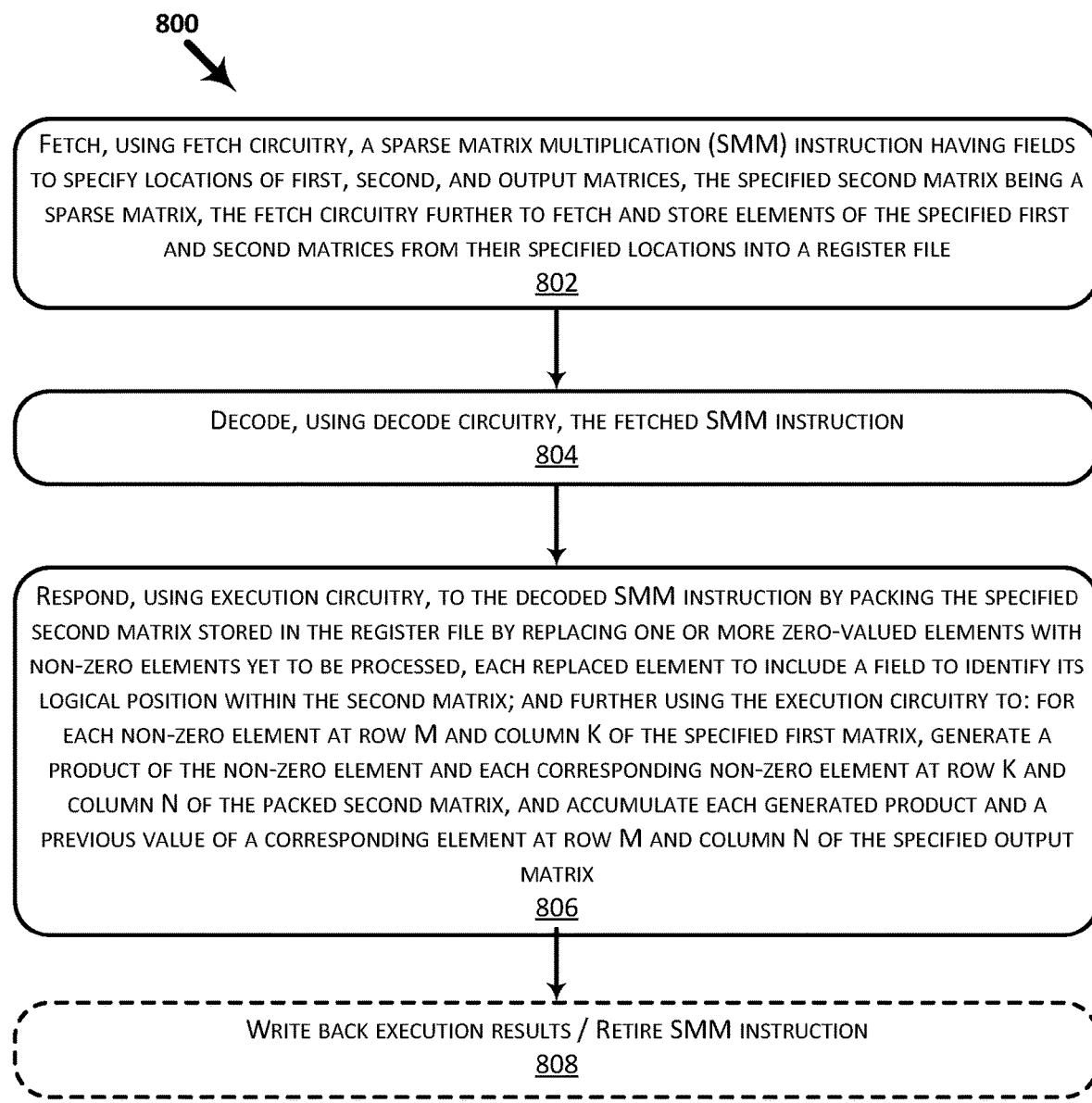
FIG. 8 is a block flow diagram illustrating a processor executing a sparse matrix multiplication (SMM) instruction, according to some embodiments.

FIG. 8 is a block flow diagram illustrating a processor executing a sparse matrix multiplication (SMM) instruction, according to some embodiments. As shown, flow 800 begins at 802, where a processor is to fetch, using fetch circuitry, the SMM instruction having fields to specify locations of first, second, and output matrices, the specified second matrix being a sparse matrix, the fetch circuitry further to fetch and store elements of the specified first and second matrices from their specified locations into a register file. At 804, the processor is to decode, using decode circuitry, the fetched SMM instruction. At 806, the processor is to respond, using execution circuitry, to the decoded SMM instruction by packing the specified second matrix stored in the register file by replacing one or more zero-valued elements with non-zero elements yet to be processed, each replaced element to include a field to identify its logical position within the second matrix; and further using the execution circuitry to: for each non-zero element at row M and column K of the specified first matrix, generate a product of the non-zero element and each corresponding non-zero element at row K and column N of the packed second matrix, and accumulate each generated product and a previous value of a corresponding element at row M and column N of the specified output matrix. In some embodiments, at 808, the processor is to write back execution results and retire the SMM instruction. Operation 808 is optional, as indicated by its dashed borders, insofar as it may occur at a different time, or not at all.

Exemplary Format of a Sparse Matrix Multiplication (SMM) Instruction

Figure 9:
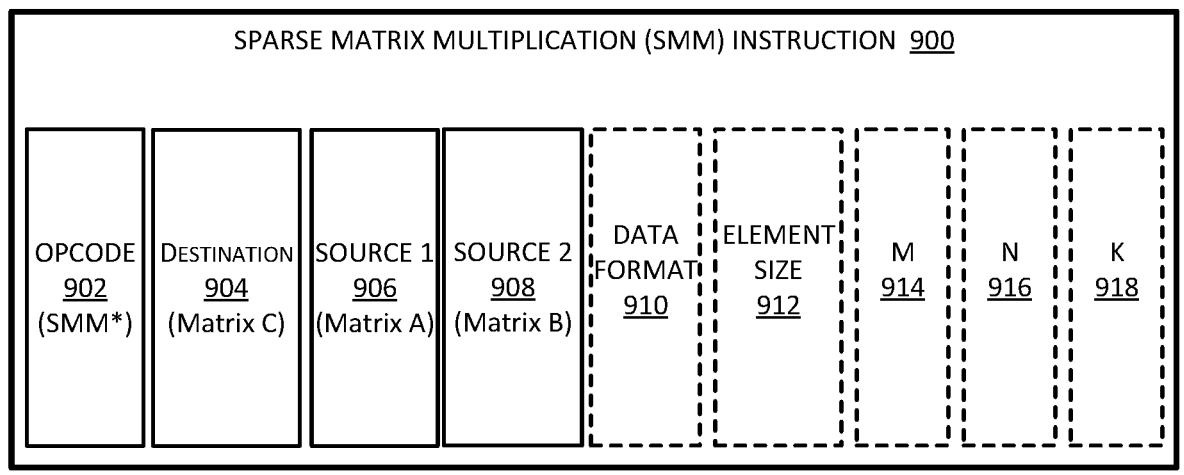
FIG. 9 shows a format of a sparse matrix multiplication (SMM) instruction, according to some embodiments.

FIG. 9 is a format of a sparse matrix multiplication (SMM) instruction, according to some embodiments. As shown, a sparse matrix multiplication (SMM) instruction 900 includes opcode 902 (SMM*), and fields to specify destination 904, source 1 906 and source 2 908 matrices. As used herein the source 1, source 2, and destination matrices are sometimes referred to as the A, B, and C matrices, respectively. SMM instruction 900 further includes optional fields to specify data format 910, such as integer, half-precision floating point, single-precision floating point, or double-precision floating point, and element size 912, in terms of a number of bits per matrix element. SMM instruction 900 sometimes includes fields to specify M 914, N 916, and K 918, where the specified A, B, and C matrices have (M×K), (K×N), and (M×N) elements, respectively. As indicated by its dashed borders, data format 910, element size 912, M 914, N 916, and K 918 are optional, insofar as they may be omitted, and assume predetermined default values. In some embodiments, one or more of data format 910, element size 912, M 914, N 916, and K 918 are specified as part of opcode 902, for example as a selected code for the opcode, a suffix, or a prefix. For example, opcode 902 may include a suffix, such as "B," "W," "D," or "Q" to specify an element size of eight, sixteen, thirty-two, or sixty-four bits, respectively. Opcode 902 is shown as including an asterisk to indicate that it may optionally include additional prefixes or suffixes to specify instruction behaviors. If SMM instruction 900 does not specify any of the optional parameters, predetermined default values are applied as needed. The format of SMM instruction 900 is further illustrated and described with respect to FIGS. 10A-B and FIGS. 11A-D.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 10A:
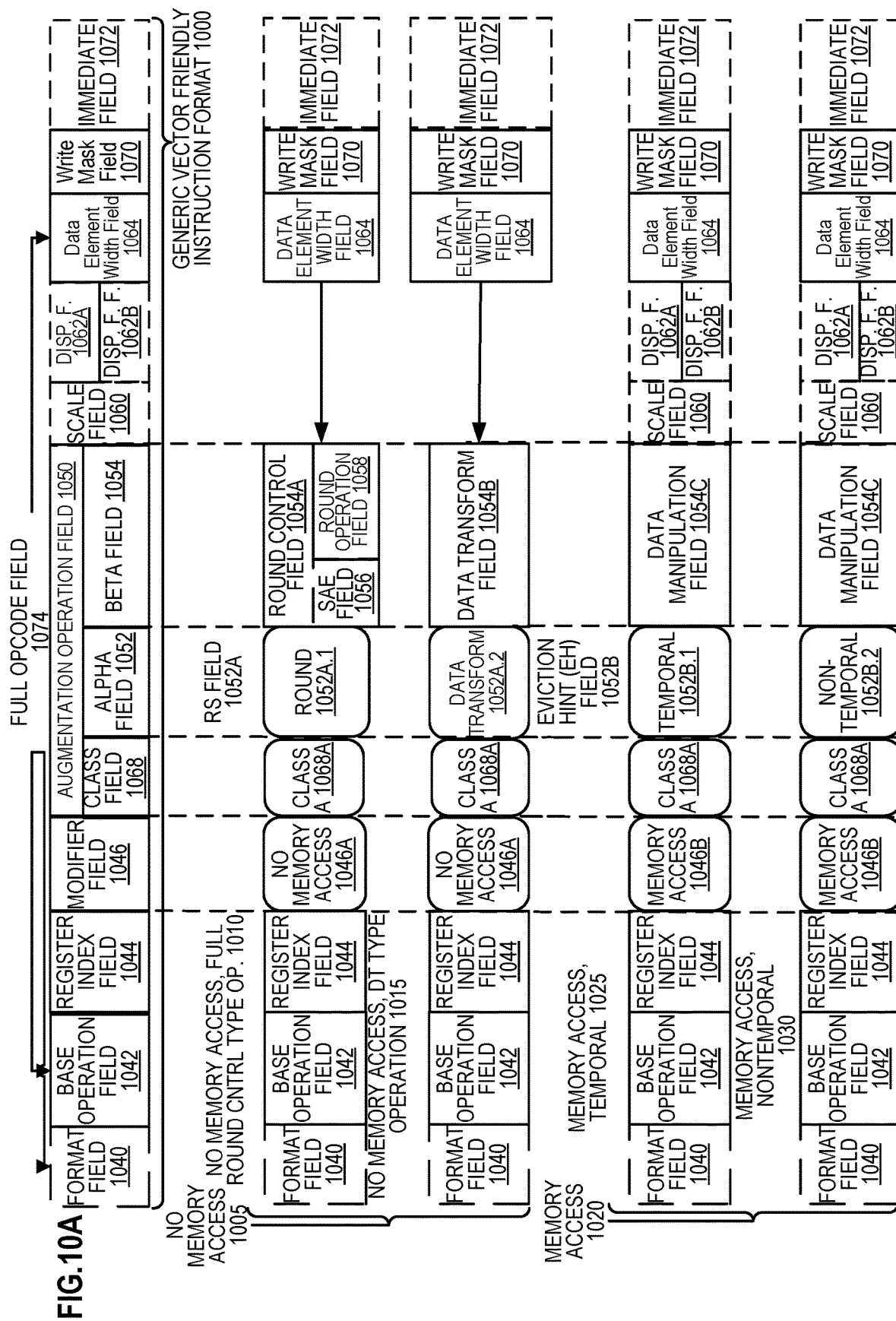
FIGS. 10A-10B are block diagrams illustrating a generic vector friendly instruction format and instruction templates thereof according to some embodiments of the invention.
Figure 10B:
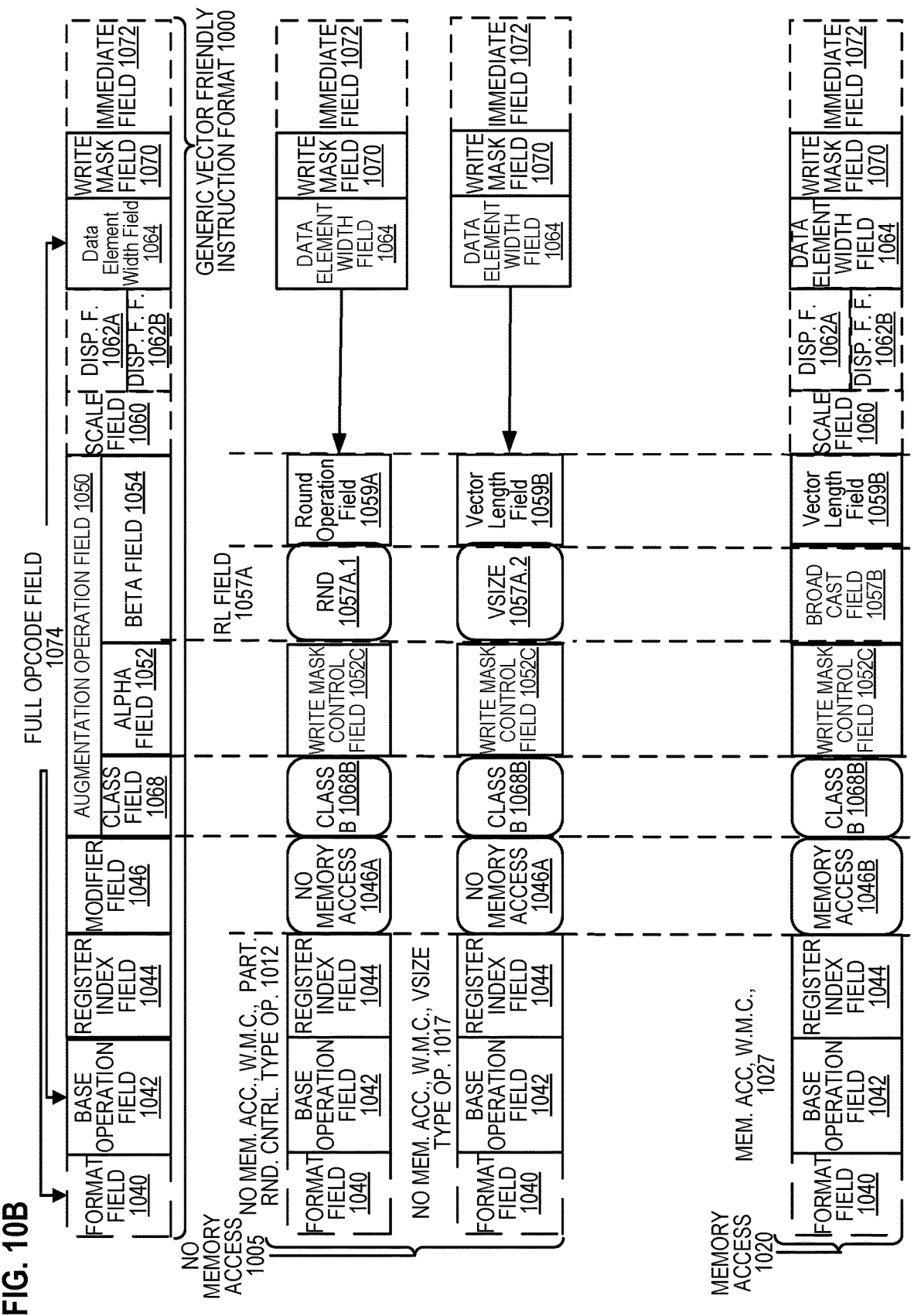

FIGS. 10A-10B are block diagrams illustrating a generic vector friendly instruction format and instruction templates thereof according to some embodiments of the invention. FIG. 10A is a block diagram illustrating a generic vector friendly instruction format and class A instruction templates thereof according to some embodiments of the invention; while FIG. 10B is a block diagram illustrating the generic vector friendly instruction format and class B instruction templates thereof according to some embodiments of the invention. Specifically, a generic vector friendly instruction format 1000 for which are defined class A and class B instruction templates, both of which include no memory access 1005 instruction templates and memory access 1020 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 10A include: 1) within the no memory access 1005 instruction templates there is shown a no memory access, full round control type operation 1010 instruction template and a no memory access, data transform type operation 1015 instruction template; and 2) within the memory access 1020 instruction templates there is shown a memory access, temporal 1025 instruction template and a memory access, non-temporal 1030 instruction template. The class B instruction templates in FIG. 10B include: 1) within the no memory access 1005 instruction templates there is shown a no memory access, write mask control, partial round control type operation 1012 instruction template and a no memory access, write mask control, vsize type operation 1017 instruction template; and 2) within the memory access 1020 instruction templates there is shown a memory access, write mask control 1027 instruction template.

The generic vector friendly instruction format 1000 includes the following fields listed below in the order illustrated in FIGS. 10A-10B.

Format field 1040—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1042—its content distinguishes different base operations.

Register index field 1044—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1046—its content distinguishes occurrences of instructions in the generic vector instruction format that specify memory access from those that do not; that is, between no memory access 1005 instruction templates and memory access 1020 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1050—its content distinguishes which one of a variety of different operations to be performed in addition to the base operation. This field is context specific. In some embodiments, this field is divided into a class field 1068, an alpha field 1052, and a beta field 1054. The augmentation operation field 1050 allows common groups of operations to be performed in a single instruction rather than 2, 3, or 4 instructions.

Scale field 1060—its content allows for the scaling of the index field's content for memory address generation (e.g., for address generation that uses $2^{scale}*\text{index}+\text{base}$).

Displacement Field 1062A—its content is used as part of memory address generation (e.g., for address generation that uses $2^{scale}*\text{index}+\text{base}+\text{displacement}$).

Displacement Factor Field 1062B (note that the juxtaposition of displacement field 1062A directly over displacement factor field 1062B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1074 (described later herein) and the data manipulation field 1054C. The displacement field 1062A and the displacement factor field 1062B are optional in the sense that they are not used for the no memory access 1005 instruction templates and/or different embodiments may implement only one or none of the two.

Data element width field 1064—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1070—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1070 allows for partial vector operations, including loads, stores, arithmetic, logical, etc. While embodiments of the invention are described in which the write mask field's 1070 content selects one of a number of write mask registers that contains the write mask to be used (and thus the write mask field's 1070 content indirectly identifies that masking to be performed), alternative embodiments instead or additional allow the mask write field's 1070 content to directly specify the masking to be performed.

Immediate field 1072—its content allows for the specification of an immediate. This field is optional in the sense that is it not present in an implementation of the generic vector friendly format that does not support immediate and it is not present in instructions that do not use an immediate.

Class field 1068—its content distinguishes between different classes of instructions. With reference to FIGS. 10A-B, the contents of this field select between class A and class B instructions. In FIGS. 10A-B, rounded corner squares are used to indicate a specific value is present in a field (e.g., class A 1068A and class B 1068B for the class field 1068 respectively in FIGS. 10A-B).

Instruction Templates of Class A

In the case of the non-memory access 1005 instruction templates of class A, the alpha field 1052 is interpreted as an RS field 1052A, whose content distinguishes which one of the different augmentation operation types are to be performed (e.g., round 1052A.1 and data transform 1052A.2 are respectively specified for the no memory access, round type operation 1010 and the no memory access, data transform type operation 1015 instruction templates), while the beta field 1054 distinguishes which of the operations of the specified type is to be performed. In the no memory access 1005 instruction templates, the scale field 1060, the displacement field 1062A, and the displacement scale filed 1062B are not present.

No-Memory Access Instruction Templates—Full Round Control Type Operation

In the no memory access full round control type operation 1010 instruction template, the beta field 1054 is interpreted as a round control field 1054A, whose content(s) provide static rounding. While in the described embodiments of the invention the round control field 1054A includes a suppress all floating point exceptions (SAE) field 1056 and a round operation control field 1058, alternative embodiments may support may encode both these concepts into the same field or only have one or the other of these concepts/fields (e.g., may have only the round operation control field 1058).

SAE field 1056—its content distinguishes whether or not to disable the exception event reporting; when the SAE field's 1056 content indicates suppression is enabled, a given instruction does not report any kind of floating-point exception flag and does not raise any floating point exception handler.

Round operation control field 1058—its content distinguishes which one of a group of rounding operations to perform (e.g., Round-up, Round-down, Round-towards-zero and Round-to-nearest). Thus, the round operation control field 1058 allows for the changing of the rounding mode on a per instruction basis. In some embodiments where a processor includes a control register for specifying rounding modes, the round operation control field's 1050 content overrides that register value.

No Memory Access Instruction Templates—Data Transform Type Operation

In the no memory access data transform type operation 1015 instruction template, the beta field 1054 is interpreted as a data transform field 1054B, whose content distinguishes which one of a number of data transforms is to be performed (e.g., no data transform, swizzle, broadcast).

In the case of a memory access 1020 instruction template of class A, the alpha field 1052 is interpreted as an eviction hint field 1052B, whose content distinguishes which one of the eviction hints is to be used (in FIG. 10A, temporal 1052B.1 and non-temporal 1052B.2 are respectively specified for the memory access, temporal 1025 instruction template and the memory access, non-temporal 1030 instruction template), while the beta field 1054 is interpreted as a data manipulation field 1054C, whose content distinguishes which one of a number of data manipulation operations (also known as primitives) is to be performed (e.g., no manipulation; broadcast; up conversion of a source; and down conversion of a destination). The memory access 1020 instruction templates include the scale field 1060, and optionally the displacement field 1062A or the displacement scale field 1062B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1052 is interpreted as a write mask control (Z) field 1052C, whose content distinguishes whether the write masking controlled by the write mask field 1070 should be a merging or a zeroing.

In the case of the non-memory access 1005 instruction templates of class B, part of the beta field 1054 is interpreted as an RL field 1057A, whose content distinguishes which one of the different augmentation operation types are to be performed (e.g., round 1057A.1 and vector length (VSIZE) 1057A.2 are respectively specified for the no memory access, write mask control, partial round control type operation 1012 instruction template and the no memory access, write mask control, VSIZE type operation 1017 instruction template), while the rest of the beta field 1054 distinguishes which of the operations of the specified type is to be performed. In the no memory access 1005 instruction templates, the scale field 1060, the displacement field 1062A, and the displacement scale filed 1062B are not present.

In the no memory access, write mask control, partial round control type operation 1010 instruction template, the rest of the beta field 1054 is interpreted as a round operation field 1059A and exception event reporting is disabled (a given instruction does not report any kind of floating-point exception flag and does not raise any floating point exception handler).

Round operation control field 1059A—just as round operation control field 1058, its content distinguishes which one of a group of rounding operations to perform (e.g., Round-up, Round-down, Round-towards-zero and Round-to-nearest). Thus, the round operation control field 1059A allows for the changing of the rounding mode on a per instruction basis. In some embodiments where a processor includes a control register for specifying rounding modes, the round operation control field's 1050 content overrides that register value.

In the no memory access, write mask control, VSIZE type operation 1017 instruction template, the rest of the beta field 1054 is interpreted as a vector length field 1059B, whose content distinguishes which one of a number of data vector lengths is to be performed on (e.g., 128, 256, or 512 byte).

In the case of a memory access 1020 instruction template of class B, part of the beta field 1054 is interpreted as a broadcast field 1057B, whose content distinguishes whether or not the broadcast type data manipulation operation is to be performed, while the rest of the beta field 1054 is interpreted the vector length field 1059B. The memory access 1020 instruction templates include the scale field 1060, and optionally the displacement field 1062A or the displacement scale field 1062B.

With regard to the generic vector friendly instruction format 1000, a full opcode field 1074 is shown including the format field 1040, the base operation field 1042, and the data element width field 1064. While one embodiment is shown where the full opcode field 1074 includes all of these fields, the full opcode field 1074 includes less than all of these fields in embodiments that do not support all of them. The full opcode field 1074 provides the operation code (opcode).

The augmentation operation field 1050, the data element width field 1064, and the write mask field 1070 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 11A is a block diagram illustrating an exemplary specific vector friendly instruction format according to some embodiments of the invention. FIG. 11A shows a specific vector friendly instruction format 1100 that is specific in the sense that it specifies the location, size, interpretation, and order of the fields, as well as values for some of those fields. The specific vector friendly instruction format 1100 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 10 into which the fields from FIG. 11A map are illustrated.

It should be understood that, although embodiments of the invention are described with reference to the specific vector friendly instruction format 1100 in the context of the generic vector friendly instruction format 1000 for illustrative purposes, the invention is not limited to the specific vector friendly instruction format 1100 except where claimed. For example, the generic vector friendly instruction format 1000 contemplates a variety of possible sizes for the various fields, while the specific vector friendly instruction format

1100 is shown as having fields of specific sizes. By way of specific example, while the data element width field 1064 is illustrated as a one bit field in the specific vector friendly instruction format 1100, the invention is not so limited (that is, the generic vector friendly instruction format 1000 contemplates other sizes of the data element width field 1064).

The generic vector friendly instruction format 1000 includes the following fields listed below in the order illustrated in FIG. 11A.

EVEX Prefix (Bytes 0-3) 1102—is encoded in a four-byte form.

Format Field 1040 (EVEX Byte 0, bits [7:0])—the first byte (EVEX Byte 0) is the format field 1040 and it contains 0x62 (the unique value used for distinguishing the vector friendly instruction format in some embodiments).

The second-fourth bytes (EVEX Bytes 1-3) include a number of bit fields providing specific capability.

REX field 1105 (EVEX Byte 1, bits [7-5])—consists of a EVEX.R bit field (EVEX Byte 1, bit [7]-R), EVEX.X bit field (EVEX byte 1, bit [6]-X), and 1057BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' 1110A—this is the first part of the REX' field 1110 and is the EVEX.R' bit field (EVEX Byte 1, bit [4]-R') that is used to encode either the upper 16 or lower 16 of the extended 32 register set. In some embodiments, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1115 (EVEX byte 1, bits [3:0]-mmmm)—its content encodes an implied leading opcode byte (0F, 0F 38, or 0F 3).

Data element width field 1064 (EVEX byte 2, bit [7]-W)—is represented by the notation EVEX.W. EVEX.W is used to define the granularity (size) of the datatype (either 32-bit data elements or 64-bit data elements).

EVEX.vvvv 1120 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1120 encodes the 4 low-order bits of the first source register specifier stored in inverted (1s complement) form. Depending on the instruction, an extra different EVEX bit field is used to extend the specifier size to 32 registers.

EVEX.U 1068 Class field (EVEX byte 2, bit [2]-U)—If EVEX.U=0, it indicates class A or EVEX.U0; if EVEX.U=1, it indicates class B or EVEX.U1.

Prefix encoding field 1125 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use an SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1052 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1054 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' 1110B—this is the remainder of the REX' field 1110 and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1070 (EVEX byte 3, bits [2:0]-kkk)—its content specifies the index of a register in the write mask registers as previously described. In some embodiments, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1130 (Byte 4) is also known as the opcode byte. Part of the opcode is specified in this field.

MOD R/M Field 1140 (Byte 5) includes MOD field 1142, Reg field 1144, and R/M field 1146. As previously described, the MOD field's 1142 content distinguishes between memory access and non-memory access operations. The role of Reg field 1144 can be summarized to two situations: encoding either the destination register operand or a source register operand or be treated as an opcode extension and not used to encode any instruction operand. The role of R/M field 1146 may include the following: encoding the instruction operand that references a memory address or encoding either the destination register operand or a source register operand.

Scale, Index, Base (SIB) Byte (Byte 6)—As previously described, the scale field's 1050 content is used for memory address generation. SIB.xxx 1154 and SIB.bbb 1156—the contents of these fields have been previously referred to with regard to the register indexes Xxxx and Bbbb.

Displacement field 1062A (Bytes 7-10)—when MOD field 1142 contains 10, bytes 7-10 are the displacement field 1062A, and it works the same as the legacy 32-bit displacement (disp32) and works at byte granularity.

Displacement factor field 1062B (Byte 7)—when MOD field 1142 contains 01, byte 7 is the displacement factor field 1062B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1062B is a reinterpretation of disp8; when using displacement factor field 1062B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1062B substitutes the legacy x86 instruction set 8-bit displacement. Thus, the displacement factor field 1062B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1072 operates as previously described.

Full Opcode Field

FIG. 11B is a block diagram illustrating the fields of the specific vector friendly instruction format 1100 that make up the full opcode field 1074 according to some embodiments. Specifically, the full opcode field 1074 includes the format field 1040, the base operation field 1042, and the data element width (W) field 1064. The base operation field 1042 includes the prefix encoding field 1125, the opcode map field 1115, and the real opcode field 1130.

Register Index Field

FIG. 11C is a block diagram illustrating the fields of the specific vector friendly instruction format 1100 that make up the register index field 1044 according to some embodiments. Specifically, the register index field 1044 includes the REX field 1105, the REX' field 1110, the MODR/M.reg field 1144, the MODR/M.r/m field 1146, the VVVV field 1120, xxx field 1154, and the bbb field 1156.

Augmentation Operation Field

Figure 11D:
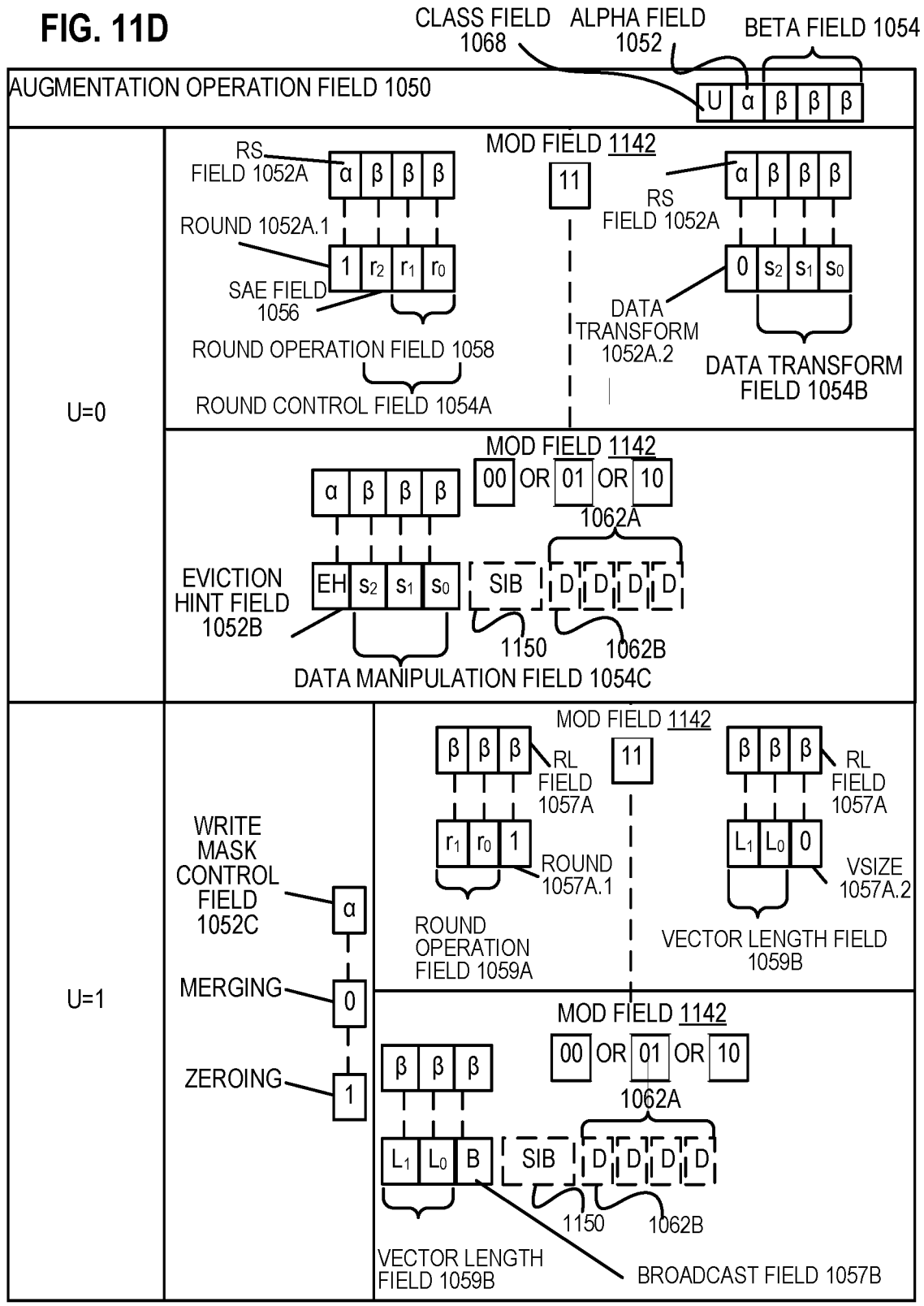
FIG. 11D is a block diagram illustrating the fields of the specific vector friendly instruction format that make up the augmentation operation field according to one embodiment.

FIG. 11D is a block diagram illustrating the fields of the specific vector friendly instruction format 1100 that make up the augmentation operation field 1050 according to some embodiments. When the class (U) field 1068 contains 0, it signifies EVEX.U0 (class A 1068A); when it contains 1, it signifies EVEX.U1 (class B 1068B). When U=0 and the MOD field 1142 contains 11 (signifying a no memory access operation), the alpha field 1052 (EVEX byte 3, bit [7]-EH) is interpreted as the rs field 1052A. When the rs field 1052A contains a 1 (round 1052A.1), the beta field 1054 (EVEX byte 3, bits [6:4]-SSS) is interpreted as the round control field 1054A. The round control field 1054A includes a one bit SAE field 1056 and a two bit round operation field 1058. When the rs field 1052A contains a 0 (data transform 1052A.2), the beta field 1054 (EVEX byte 3, bits [6:4]-SSS) is interpreted as a three bit data transform field 1054B. When U=0 and the MOD field 1142 contains 00, 01, or 10 (signifying a memory access operation), the alpha field 1052 (EVEX byte 3, bit [7]-EH) is interpreted as the eviction hint (EH) field 1052B and the beta field 1054 (EVEX byte 3, bits [6:4]-SSS) is interpreted as a three bit data manipulation field 1054C.

When U=1, the alpha field 1052 (EVEX byte 3, bit [7]-EH) is interpreted as the write mask control (Z) field 1052C. When U=1 and the MOD field 1142 contains 11 (signifying a no memory access operation), part of the beta field 1054 (EVEX byte 3, bit [4]-$S_0$) is interpreted as the RL field 1057A; when it contains a 1 (round 1057A.1) the rest of the beta field 1054 (EVEX byte 3, bit [6-5]-$S_{2-1}$) is interpreted as the round operation field 1059A, while when the RL field 1057A contains a 0 (VSIZE 1057.A2) the rest of the beta field 1054 (EVEX byte 3, bit [6-5]-$S_{2-1}$) is interpreted as the vector length field 1059B (EVEX byte 3, bit [6-5]-$L_{1-0}$). When U=1 and the MOD field 1142 contains 00, 01, or 10 (signifying a memory access operation), the beta field 1054 (EVEX byte 3, bits [6:4]-SSS) is interpreted as the vector length field 1059B (EVEX byte 3, bit [6-5]-$L_{1-0}$) and the broadcast field 1057B (EVEX byte 3, bit [4]-B).

Exemplary Register Architecture

Figure 12:
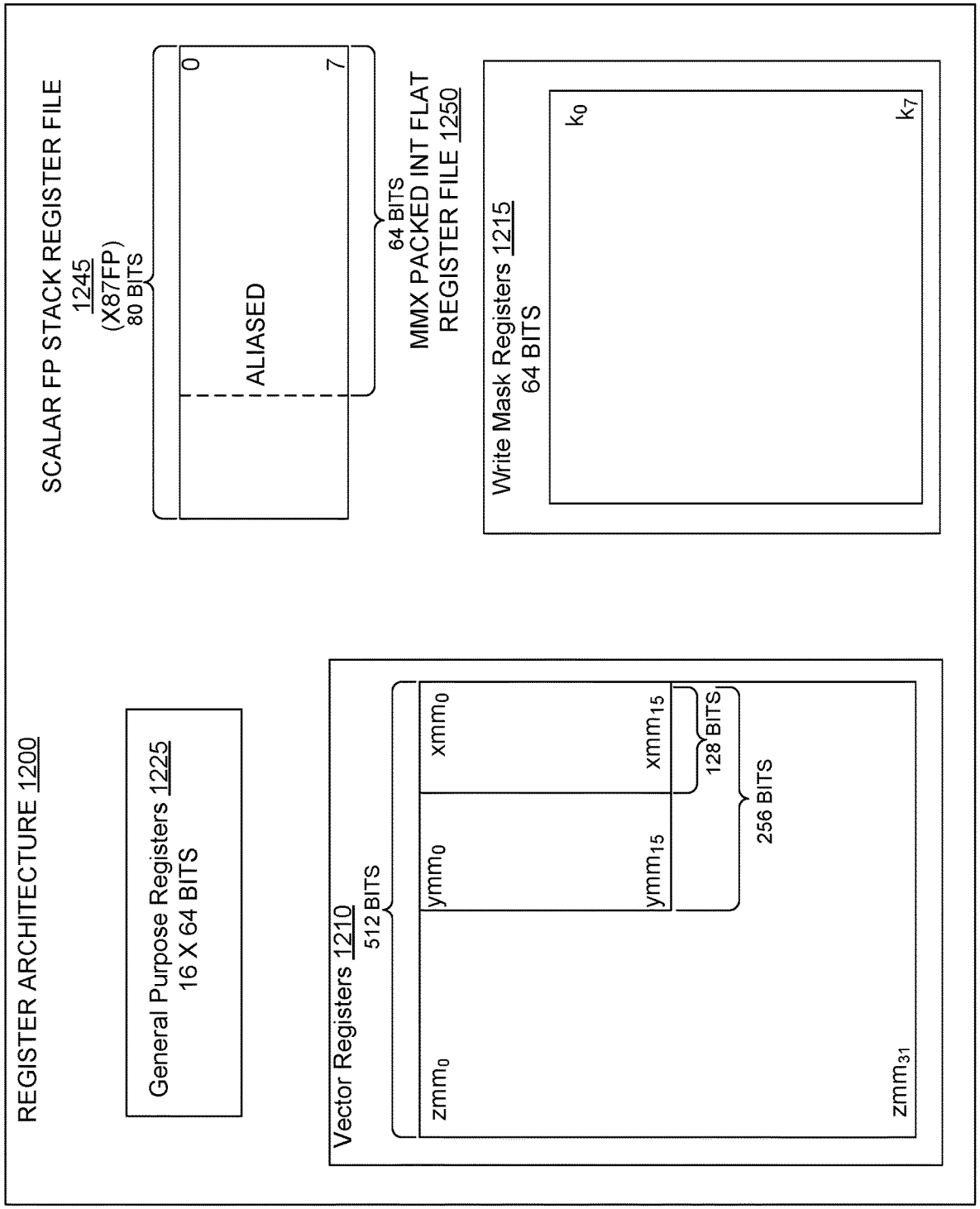
FIG. 12 is a block diagram of a register architecture according to one embodiment.

FIG. 12 is a block diagram of a register architecture 1200 according to some embodiments. In the embodiment illustrated, there are 32 vector registers 1210 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1100 operates on these overlaid register file as illustrated in the below tables.

| Adjustable Vector Length | Class | Operations | Registers |
|---|---|---|---|
| Instruction Templates that do not include the vector length field 1059B | A (FIG. 10A; U = 0) | 1010, 1015, 1025, 1030 | zmm registers (the vector length is 64 byte) |
| | B (FIG. 10B; U = 1) | 1012 | zmm registers (the vector length is 64 byte) |
| Instruction templates that do include the vector length field 1059B | B (FIG. 10B; U = 1) | 1017, 1027 | zmm, ymm, or xmm registers (the vector length is 64 byte, 32 byte, or 16 byte) depending on the vector length field 1059B |

In other words, the vector length field 1059B selects between a maximum length and one or more other shorter lengths, where each such shorter length is half the length of the preceding length; and instructions templates without the vector length field 1059B operate on the maximum vector length. Further, in one embodiment, the class B instruction templates of the specific vector friendly instruction format 1100 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1215—in the embodiment illustrated, there are 8 write mask registers (k0 through k7), each 64 bits in size. In an alternate embodiment, the write mask registers 1215 are 16 bits in size. As previously described, in some embodiments, the vector mask register k0 cannot be used as a write mask; when the encoding that would normally indicate k0 is used for a write mask, it selects a hardwired write mask of 0xffff, effectively disabling write masking for that instruction.

General-purpose registers 1225—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1245, on which is aliased the MMX packed integer flat register file 1250—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 13A is a block diagram illustrating both an exemplary in-order pipeline and an exemplary register renaming, out-of-order issue/execution pipeline according to some embodiments of the invention. FIG. 13B is a block diagram illustrating both an exemplary embodiment of an in-order architecture core and an exemplary register renaming, out-of-order issue/execution architecture core to be included in a processor according to some embodiments of the invention. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end unit 1330 coupled to an execution engine unit 1350, and both are coupled to a memory unit 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1358 comprises a vector registers unit, a write mask registers unit, and a scalar registers unit. These register units may provide architectural vector registers, vector mask registers, and general purpose registers. The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1354 and the physical register file(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating point/packed integer/ packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the schedule stage 1312; 5) the physical register file(s) unit(s) 1358 and the memory unit 1370 perform the register read/memory read stage 1314; the execution cluster 1360 perform the execute stage 1316; 6) the memory unit 1370 and the physical register file(s) unit(s) 1358 perform the write back/memory write stage 1318; 7) various units may be involved in the exception handling stage 1322; and 8) the retirement unit 1354 and the physical register file(s) unit(s) 1358 perform the commit stage 1324.

The core 1390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 14A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 14A is a block diagram of a single processor core, along with its connection to the on-die interconnect network 1402 and with its local subset of the Level 2 (L2) cache 1404, according to some embodiments of the invention. In one embodiment, an instruction decoder 1400 supports the x86 instruction set with a packed data instruction set extension. An L1 cache 1406 allows low-latency accesses to cache memory into the scalar and vector units. While in one embodiment (to simplify the design), a scalar unit 1408 and a vector unit 1410 use separate register sets (respectively, scalar registers 1412 and vector registers 1414) and data transferred between them is written to memory and then read back in from a level 1 (L1) cache 1406, alternative embodiments of the invention may use a different approach (e.g., use a single register set or include a communication path that allow data to be transferred between the two register files without being written and read back).

The local subset of the L2 cache 1404 is part of a global L2 cache that is divided into separate local subsets, one per processor core. Each processor core has a direct access path to its own local subset of the L2 cache 1404. Data read by a processor core is stored in its L2 cache subset 1404 and can be accessed quickly, in parallel with other processor cores accessing their own local L2 cache subsets. Data written by a processor core is stored in its own L2 cache subset 1404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 14B is an expanded view of part of the processor core in FIG. 14A according to some embodiments of the invention. FIG. 14B includes an L1 data cache 1406A part of the L1 cache 1404, as well as more detail regarding the vector unit 1410 and the vector registers 1414. Specifically, the vector unit 1410 is a 16-wide vector processing unit (VPU) (see the 16-wide ALU 1428), which executes one or more of integer, single-precision float, and double-precision float instructions. The VPU supports swizzling the register inputs with swizzle unit 1420, numeric conversion with numeric convert units 1422A-B, and replication with replication unit 1424 on the memory input. Write mask registers 1426 allow predicating resulting vector writes.

Figure 15:
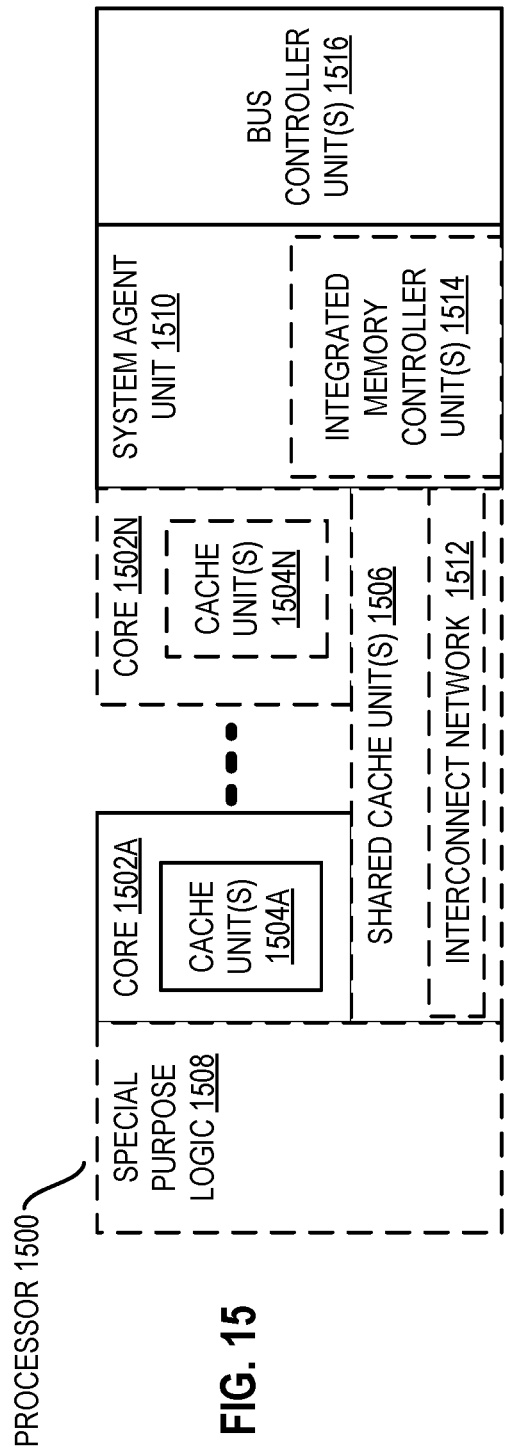
FIG. 15 is a block diagram of a processor that may have more than one core, may have an integrated memory controller, and may have integrated graphics according to some embodiments.

FIG. 15 is a block diagram of a processor 1500 that may have more than one core, may have an integrated memory controller, and may have integrated graphics according to some embodiments of the invention. The solid lined boxes in FIG. 15 illustrate a processor 1500 with a single core 1502A, a system agent 1510, a set of one or more bus controller units 1516, while the optional addition of the dashed lined boxes illustrates an alternative processor 1500 with multiple cores 1502A-N, a set of one or more integrated memory controller unit(s) 1514 in the system agent unit 1510, and special purpose logic 1508.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special purpose cores intended primarily for graphics and/or scientific (throughput); and 3) a coprocessor with the cores 1502A-N being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1506, and external memory (not shown) coupled to the set of integrated memory controller units 1514. The set of shared cache units 1506 may include one or more mid-level caches, such as level 2 (L2), level 3 (L3), level 4 (L4), or other levels of cache, a last level cache (LLC), and/or combinations thereof. While in one embodiment a ring based interconnect unit 1512 interconnects the integrated graphics logic 1508 (integrated graphics logic 1508 is an example of and is also referred to herein as special purpose logic), the set of shared cache units 1506, and the system agent unit 1510/integrated memory controller unit(s) 1514, alternative embodiments may use any number of well-known techniques for interconnecting such units. In one embodiment, coherency is maintained between one or more cache units 1506 and cores 1502A-N.

In some embodiments, one or more of the cores 1502A-N are capable of multi-threading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the integrated graphics logic 1508. The display unit is for driving one or more externally connected displays.

The cores 1502A-N may be homogenous or heterogeneous in terms of architecture instruction set; that is, two or more of the cores 1502A-N may be capable of execution the same instruction set, while others may be capable of executing only a subset of that instruction set or a different instruction set.

Exemplary Computer Architectures

FIGS. 16-19 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
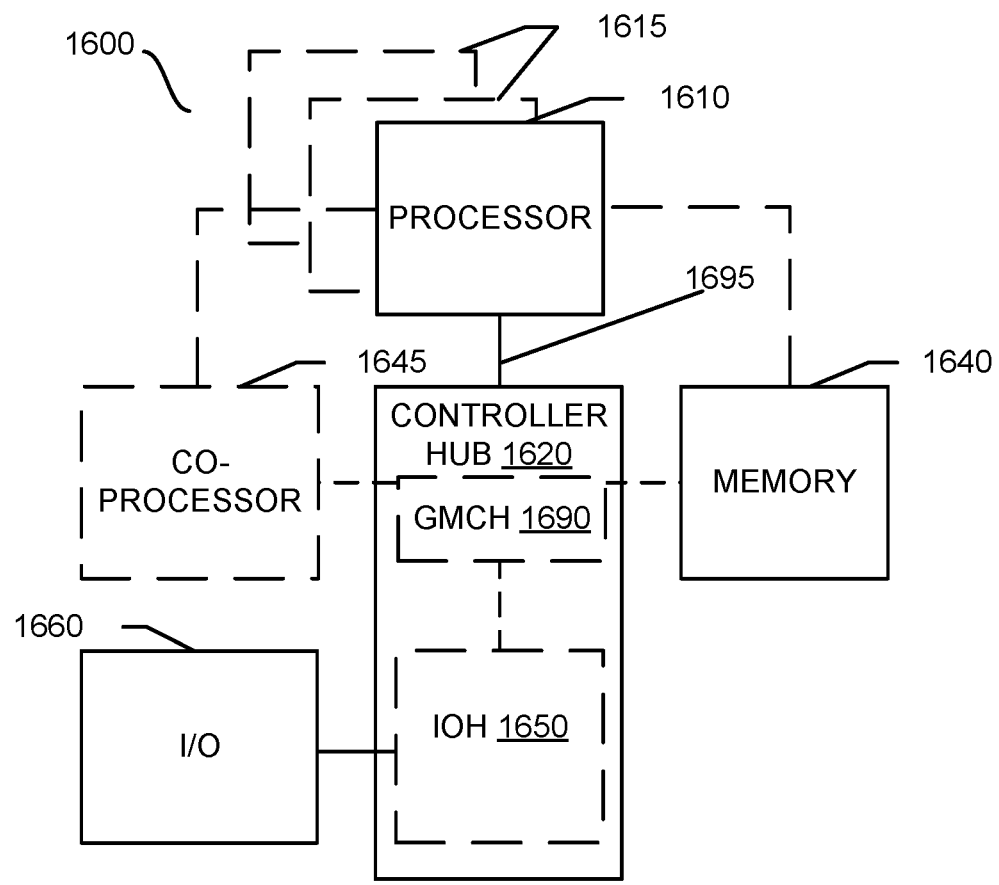
FIGS. 16-19 are block diagrams of exemplary computer architectures.

Referring now to FIG. 16, shown is a block diagram of a system 1600 in accordance with one embodiment of the present invention. The system 1600 may include one or more processors 1610, 1615, which are coupled to a controller hub 1620. In one embodiment the controller hub 1620 includes a graphics memory controller hub (GMCH) 1690 and an Input/Output Hub (IOH) 1650 (which may be on separate chips); the GMCH 1690 includes memory and graphics controllers to which are coupled memory 1640 and a coprocessor 1645; the IOH 1650 couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1620 in a single chip with the IOH 1650.

The optional nature of additional processors 1615 is denoted in FIG. 16 with broken lines. Each processor 1610, 1615 may include one or more of the processing cores described herein and may be some version of the processor 1500.

The memory 1640 may be, for example, dynamic random access memory (DRAM), phase change memory (PCM), or a combination of the two. For at least one embodiment, the controller hub 1620 communicates with the processor(s) 1610, 1615 via a multi-drop bus, such as a frontside bus (FSB), point-to-point interface such as QuickPath Interconnect (QPI), or similar connection 1695.

In one embodiment, the coprocessor 1645 is a special-purpose processor, such as, for example, a high-throughput MIC processor, a network or communication processor, compression engine, graphics processor, GPGPU, embedded processor, or the like. In one embodiment, controller hub 1620 may include an integrated graphics accelerator.

There can be a variety of differences between the physical resources 1610, 1615 in terms of a spectrum of metrics of merit including architectural, microarchitectural, thermal, power consumption characteristics, and the like.

In one embodiment, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, to coprocessor 1645. Coprocessor(s) 1645 accept and execute the received coprocessor instructions.

Figure 17:
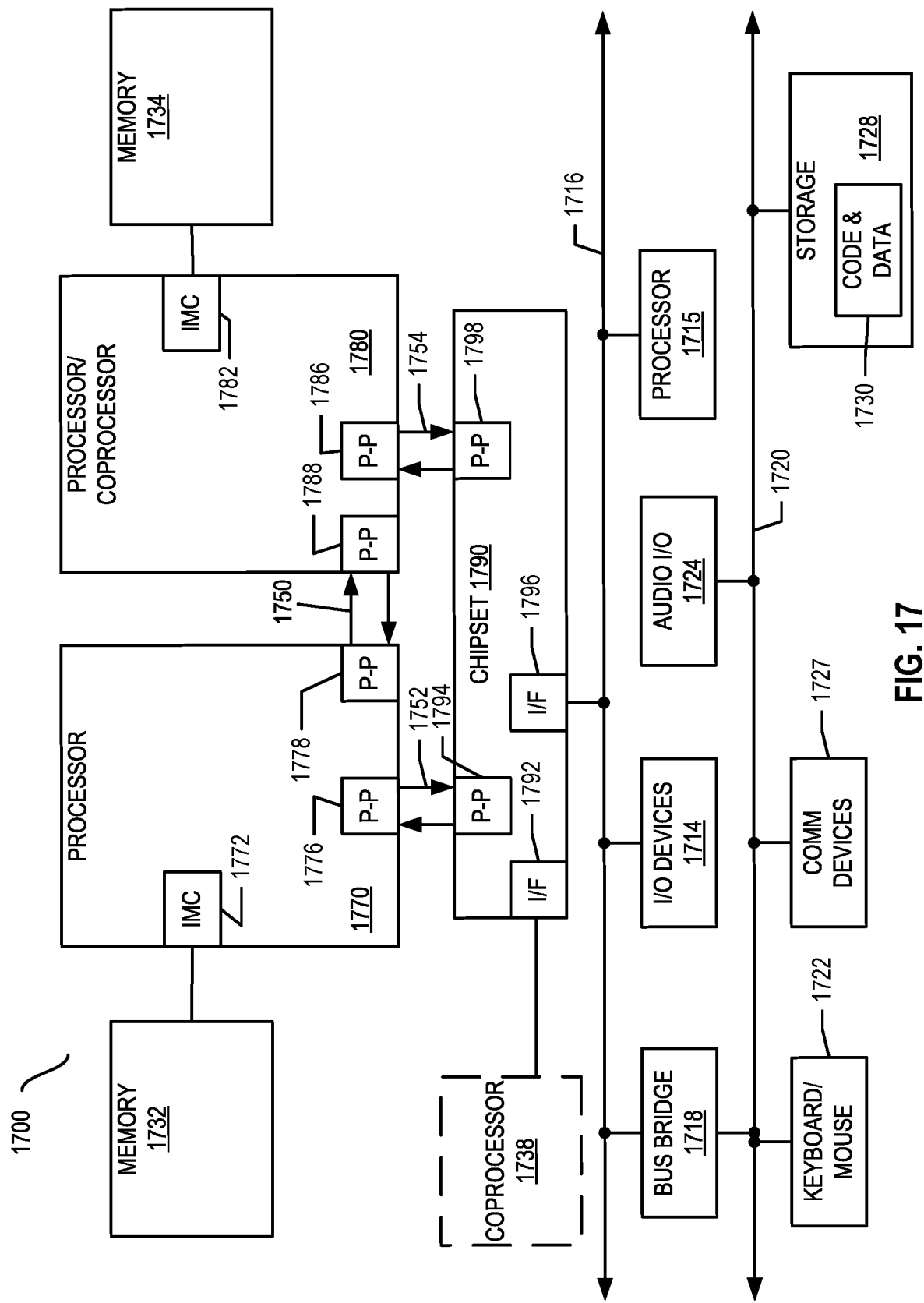

Referring now to FIG. 17, shown is a block diagram of a first more specific exemplary system 1700 in accordance with an embodiment of the present invention. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of the processor 1500. In some embodiments, processors 1770 and 1780 are respectively processors 1610 and 1615, while coprocessor 1738 is coprocessor 1645. In another embodiment, processors 1770 and 1780 are respectively processor 1610 coprocessor 1645.

Processors 1770 and 1780 are shown including integrated memory controller (IMC) units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may optionally exchange information with the coprocessor 1738 via a high-performance interface 1792. In one embodiment, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present invention is not so limited.

As shown in FIG. 17, various I/O devices 1714 may be coupled to first bus 1716, along with a bus bridge 1718 which couples first bus 1716 to a second bus 1720. In one embodiment, one or more additional processor(s) 1715, such as coprocessors, high-throughput MIC processors, GPGPU's, accelerators (such as, e.g., graphics accelerators or digital signal processing (DSP) units), field programmable gate arrays, or any other processor, are coupled to first bus 1716. In one embodiment, second bus 1720 may be a low pin count (LPC) bus. Various devices may be coupled to a second bus 1720 including, for example, a keyboard and/or mouse 1722, communication devices 1727 and a storage unit 1728 such as a disk drive or other mass storage device which may include instructions/code and data 1730, in one embodiment. Further, an audio I/O 1724 may be coupled to the second bus 1720. Note that other architectures are possible. For example, instead of the point-to-point architecture of FIG. 17, a system may implement a multi-drop bus or other such architecture.

Figure 18:
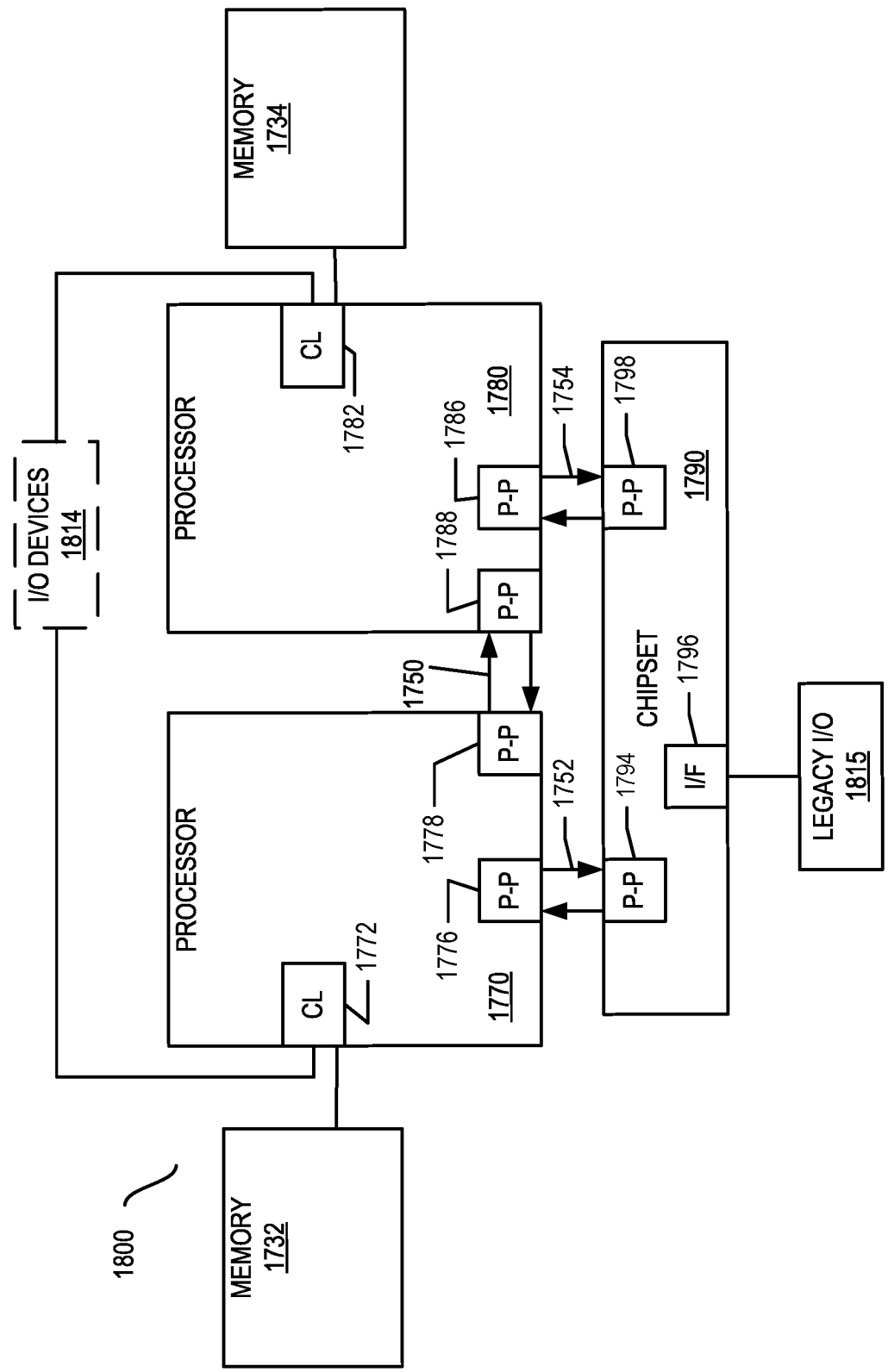

Referring now to FIG. 18, shown is a block diagram of a second more specific exemplary system 1800 in accordance with an embodiment of the present invention. Like elements in FIGS. 17 and 18 bear like reference numerals, and certain aspects of FIG. 17 have been omitted from FIG. 18 in order to avoid obscuring other aspects of FIG. 18.

FIG. 18 illustrates that the processors 1770, 1780 may include integrated memory and I/O control logic ("CL") 1772 and 1782, respectively. Thus, the CL 1772, 1782 include integrated memory controller units and include I/O control logic. FIG. 18 illustrates that not only are the memories 1732, 1734 coupled to the CL 1772, 1782, but also that I/O devices 1814 are also coupled to the control logic 1772, 1782. Legacy I/O devices 1815 are coupled to the chipset 1790.

Figure 19:
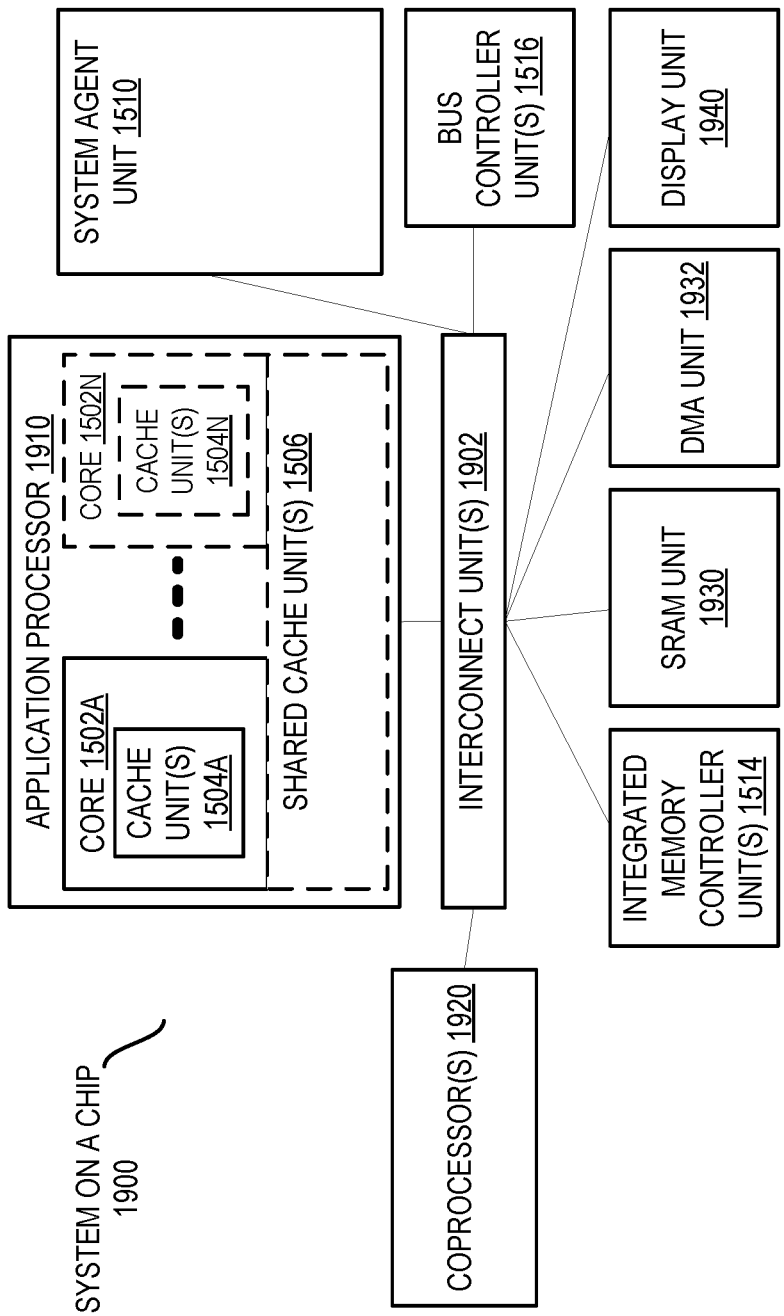

Referring now to FIG. 19, shown is a block diagram of a SoC 1900 in accordance with an embodiment of the present invention. Similar elements in FIG. 15 bear like reference numerals. Also, dashed lined boxes are optional features on more advanced SoCs. In FIG. 19, an interconnect unit(s) 1902 is coupled to: an application processor 1910 which includes a set of one or more cores 1502A-N, which include cache units 1504A-N, and shared cache unit(s) 1506; a system agent unit 1510; a bus controller unit(s) 1516; an integrated memory controller unit(s) 1514; a set or one or more coprocessors 1920 which may include integrated graphics logic, an image processor, an audio processor, and a video processor; an static random access memory (SRAM) unit 1930; a direct memory access (DMA) unit 1932; and a display unit 1940 for coupling to one or more external displays. In one embodiment, the coprocessor(s) 1920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1730 illustrated in FIG. 17, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 20 is a block diagram contrasting the use of a software instruction converter to convert binary instructions in a source instruction set to binary instructions in a target instruction set according to some embodiments of the invention. In the illustrated embodiment, the instruction converter is a software instruction converter, although alternatively the instruction converter may be implemented in software, firmware, hardware, or various combinations thereof. FIG. 20 shows a program in a high level language 2002 may be compiled using an x86 compiler 2004 to generate x86 binary code 2006 that may be natively executed by a processor with at least one x86 instruction set core 2016. The processor with at least one x86 instruction set core 2016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2004 represents a compiler that is operable to generate x86 binary code 2006 (e.g., object code) that can, with or without additional linkage processing, be executed on the processor with at least one x86 instruction set core 2016. Similarly, FIG. 20 shows the program in the high level language 2002 may be compiled using an alternative instruction set compiler 2008 to generate alternative instruction set binary code 2010 that may be natively executed by a processor without at least one x86 instruction set core 2014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2012 is used to convert the x86 binary code 2006 into code that may be natively executed by the processor without an x86 instruction set core 2014. This converted code is not likely to be the same as the alternative instruction set binary code 2010 because an instruction converter capable of this is difficult to make; however, the converted code will accomplish the general operation and be made up of instructions from the alternative instruction set. Thus, the instruction converter 2012 represents software, firmware, hardware, or a combination thereof that, through emulation, simulation or any other process, allows a processor or other electronic device that does not have an x86 instruction set processor or core to execute the x86 binary code 2006.

Further Examples

Example 1 provides an exemplary processor to execute a sparse matrix multiplication (SMM) instruction including: fetch circuitry to fetch the SMM instruction having fields to specify locations of first, second, and output matrices, the specified second matrix being a sparse matrix, the fetch circuitry further to fetch and store elements of the specified first and second matrices from a memory into a register file; decode circuitry to decode the fetched SMM instruction; execution circuitry, responsive to the decoded SMM instruction, to pack the second matrix stored in the register file by replacing one or more zero-valued elements with non-zero elements yet to be processed, each of the replaced elements further including a field to identify its logical position within the second matrix, and, the execution circuitry further to, for each non-zero element at row M and column K of the specified first matrix, generate a product of the non-zero element and each corresponding non-zero element at row K and column N of the packed second matrix, and accumulate each generated product with a previous value of a corresponding element at row M and column N of the specified output matrix.

Example 2 includes the substance of the exemplary processor of Example 1, wherein the execution circuitry, for each row K of the specified second matrix, is to determine whether the row contains any zero-valued elements, and, if so, determine whether the row contains any non-zero elements yet to be processed from the zero-valued element, and, if so, for each zero-valued element having a non-zero element yet to be processed, fold the non-zero element into the zero-valued element.

Example 3 includes the substance of the exemplary processor of Example 1, wherein the execution circuitry, for each column N of the specified second matrix, is to determine whether the column contains any zero-valued elements, and, if so, determine whether any of P elements of a subsequent column is a non-zero value, and, for each zero-valued element having a non-zero element in the subsequent column, squeeze the non-zero element into the zero-valued element.

Example 4 includes the substance of the exemplary processor of Example 1, wherein each of the elements stored in the register file includes a field to specify whether it has a zero value, and wherein the execution circuitry is to use the field when determining whether the element has a zero value.

Example 5 includes the substance of the exemplary processor of Example 1, wherein the execution circuitry is to avoid generating any products of elements having zero values.

Example 6 includes the substance of the exemplary processor Example 1, wherein the execution circuitry is to include a processing array of (X×Y) processing units, wherein X is less than M and Y is less than N, the execution circuitry to use the processing array iteratively over a plurality of clock cycles to perform the same processing as an actual, physical array of (M×N) processing units.

Example 7 includes the substance of the exemplary processor Example 1, wherein the execution circuitry is to include a processing array of (X×Y) processing units, wherein X is less than M and Y is less than N, the execution circuitry to cascade a plurality of instances of the processing array to perform the same processing as an actual, physical array of (M×N) processing units.

Example 8 provides an exemplary method of executing a sparse matrix multiplication (SMM) instruction including: fetching, using fetch circuitry, the SMM instruction having fields to specify first, second, and output matrices, the specified second matrix being a sparse matrix, the fetch circuitry further to fetch and store elements of the specified first and second matrices from a memory into a register file; decoding using decode circuitry, the fetched SMM instruction; responding, by execution circuitry, to the decoded SMM instruction by packing the specified second matrix stored in the register file by replacing one or more zero-valued elements with non-zero elements yet to be processed, each replaced element in the packed second matrix to include a field to identify its logical position within the second matrix; and further using the execution circuitry to: for each non-zero element at row M and column K of the specified first matrix, generate a product of the non-zero element and each corresponding non-zero element at row K and column N of the packed second matrix, and accumulate each generated product and a previous value of a corresponding element at row M and column N of the specified output matrix.

Example 9 includes the substance of the exemplary method of Example 8, wherein the execution circuitry, for each row K of the specified second matrix, is to determine whether the row contains any zero-valued elements, and, if so, determine whether the row contains any non-zero elements yet to be processed from the zero-valued element, and, if so, for each zero-valued element having a non-zero element yet to be processed, fold the non-zero element into the zero-valued element.

Example 10 includes the substance of the exemplary method of Example 8, wherein the execution circuitry, for each column N of the specified second matrix, is to determine whether the column contains any zero-valued elements, and, if so, determine whether any of P elements of a subsequent column is a non-zero value, and, for each zero-valued element having a non-zero element in the subsequent column, squeeze the non-zero element into the zero-valued element.

Example 11 includes the substance of the exemplary method of Example 8, wherein each of the elements stored in the register file includes a field to specify whether it has a zero value, and wherein the execution circuitry is to use the field when determining whether the element has a zero value.

Example 12 includes the substance of the exemplary method of Example 8, wherein the execution circuitry is to avoid generating any products of elements having zero values.

Example 13 includes the substance of the exemplary method Example 8, wherein the execution circuitry is to include a processing array of (X×Y) processing units, wherein X is less than M and Y is less than N, the execution circuitry to use the processing array iteratively over a plurality of clock cycles to perform the same processing as an actual, physical array of (M×N) processing units.

Example 14 includes the substance of the exemplary method Example 8, wherein the execution circuitry is to include a processing array of (X×Y) processing units, wherein X is less than M and Y is less than N, the execution circuitry to cascade a plurality of instances of the processing array to perform the same processing as an actual, physical array of (M×N) processing units.

Example 15 provides an exemplary system to execute a sparse matrix multiplication (SMM) instruction including: A memory, fetch circuitry to fetch the SMM instruction having fields to specify locations of first, second, and output matrices, the specified second matrix being a sparse matrix, the fetch circuitry further to fetch and store elements of the specified first and second matrices from the memory into a register file; decode circuitry to decode the fetched SMM instruction; execution circuitry, responsive to the decoded SMM instruction, to pack the second matrix stored in the register file by replacing one or more zero-valued elements with non-zero elements yet to be processed, each of the replaced elements further including a field to identify its logical position within the second matrix, and, the execution circuitry further to, for each non-zero element at row M and column K of the specified first matrix, generate a product of the non-zero element and each corresponding non-zero element at row K and column N of the packed second matrix, and accumulate each generated product with a previous value of a corresponding element at row M and column N of the specified output matrix.

Example 16 includes the substance of the exemplary system of Example 15, wherein the execution circuitry, for each row K of the specified second matrix, is to determine whether the row contains any zero-valued elements, and, if so, determine whether the row contains any non-zero elements yet to be processed from the zero-valued element, and, if so, for each zero-valued element having a non-zero element yet to be processed, fold the non-zero element into the zero-valued element.

Example 17 includes the substance of the exemplary system of Example 15, wherein the execution circuitry, for each column N of the specified second matrix, is to determine whether the column contains any zero-valued elements, and, if so, determine whether any of P elements of a subsequent column is a non-zero value, and, for each zero-valued element having a non-zero element in the subsequent column, squeeze the non-zero element into the zero-valued element.

Example 18 includes the substance of the exemplary system of Example 15, wherein each of the elements stored in the register file includes a field to specify whether it has a zero value, and wherein the execution circuitry is to use the field when determining whether the element has a zero value.

Example 19 includes the substance of the exemplary system of Example 15, wherein the execution circuitry is to avoid generating any products of elements having zero values.

Example 20 includes the substance of the exemplary system Example 15, wherein the execution circuitry is to include a processing array of (X×Y) processing units, wherein X is less than M and Y is less than N, the execution circuitry to use the processing array iteratively over a plurality of clock cycles to perform the same processing as an actual, physical array of (M×N) processing units.

What is claimed is:

1. A processor comprising:
   fetch and decode circuitry to fetch and decode a sparse matrix multiplication (SMM) instruction having fields to specify locations of first, second, and output matrices, the second matrix being a sparse matrix, the fetch circuitry further to fetch and store elements of the first and second matrices into a register file; and
   execution circuitry, responsive to the SMM instruction, to pack the second matrix stored in the register file by replacing one or more zero-valued elements in a column N of the second matrix with non-zero elements yet to be processed, each of the replaced elements further including a field to identify its logical position within the second matrix, and the execution circuitry further to generate a product of a non-zero element at column K of the first matrix and a corresponding non-zero element at row K of the packed second matrix for each non-zero element in row M of the first matrix and each non-zero element in column N of the packed second matrix, and accumulate each generated product with a previous value of a corresponding element at row M and column N of the output matrix.

2. The processor of claim 1, wherein the execution circuitry, for each row K of the second matrix, is to determine whether the row contains any zero-valued elements, and, if so, determine whether the row contains any non-zero elements yet to be processed from the zero-valued element, and, if so, for each zero-valued element having a non-zero element yet to be processed, fold the non-zero element into the zero-valued element.

3. The processor of claim 1, wherein the execution circuitry, for each column N of the second matrix, is to determine whether the column contains any zero-valued elements, and, if so, determine whether any of P elements of a subsequent column is a non-zero value, and, for each zero-valued element having a non-zero element in the subsequent column, squeeze the non-zero element into the zero-valued element.

4. The processor of claim 1, wherein each of the elements stored in the register file includes a field to specify whether it has a zero value, and wherein the execution circuitry is to use the field when determining whether the element has a zero value.

5. The processor of claim 1, wherein the execution circuitry is to avoid generating any products of elements having zero values.

6. The processor of claim 1, wherein the execution circuitry is to comprise a processing array of (X×Y) processing units, wherein X is less than M and Y is less than N, the execution circuitry to use the processing array iteratively over a plurality of clock cycles to perform the same processing as an actual, physical array of (M×N) processing units.

7. The processor of claim 1, wherein the execution circuitry is to comprise a processing array of (X×Y) processing units, wherein X is less than M and Y is less than N, the execution circuitry to cascade a plurality of instances of the processing array to perform the same processing as an actual, physical array of (M×N) processing units.

8. A method executed by a processor, the method comprising:
   fetching and decoding, using fetch and decode circuitry, a sparse matrix multiplication (SMM) instruction having fields to specify locations of first, second, and output matrices, the second matrix being a sparse matrix, the fetch circuitry further fetching and storing elements of the first and second matrices into a register file; and
   responding, using execution circuitry, to the SMM instruction by packing the second matrix stored in the register file by replacing one or more zero-valued elements in a column N of the second matrix with non-zero elements yet to be processed, each replaced element to include a field to identify its logical position within the second matrix, the execution circuitry further to generate a product of a non-zero element at column K of the first matrix and a corresponding non-zero element at row K of the packed second matrix for each non-zero element in row M of the first matrix and each non-zero element in column N of the packed second matrix, and accumulate each generated product with a previous value of a corresponding element at row M and column N of the output matrix.

9. The method of claim 8, wherein the execution circuitry, for each row K of the second matrix, is to determine whether the row contains any zero-valued elements, and, if so, determine whether the row contains any non-zero elements yet to be processed from the zero-valued element, and, if so, for each zero-valued element having a non-zero element yet to be processed, fold the non-zero element into the zero-valued element.

10. The method of claim 8, wherein the execution circuitry, for each column N of the second matrix, is to determine whether the column contains any zero-valued elements, and, if so, determine whether any of P elements of a subsequent column is a non-zero value, and, for each zero-valued element having a non-zero element in the subsequent column, squeeze the non-zero element into the zero-valued element.

11. The method of claim 8, wherein each of the elements stored in the register file includes a field to specify whether it has a zero value, and wherein the execution circuitry is to use the field when determining whether the element has a zero value.

12. The method of claim 8, wherein the execution circuitry is to avoid generating any products of elements having zero values.

13. The method of claim 8, wherein the execution circuitry comprises a processing array of (X×Y) processing units, X being less than M and Y being less than N, the execution circuitry using the processing array iteratively over a plurality of clock cycles to perform the same processing as an actual, physical array of (M×N) processing units.

14. The method of claim 8, wherein the execution circuitry comprises a processing array of (X×Y) processing units, X being less than M and Y being less than N, the execution circuitry cascading a plurality of instances of the processing array to perform the same processing as an actual, physical array of (M×N) processing units.

15. A system comprising a memory and a processor, the processor comprising:
   fetch and decode circuitry to fetch and decode a sparse matrix multiplication (SMM) instruction having fields to specify locations of first, second, and output matrices, the second matrix being a sparse matrix, the fetch circuitry further to fetch and store elements of the first and second matrices into a register file; and execution circuitry, responsive to the SMM instruction, to pack the second matrix stored in the register file by replacing one or more zero-valued elements in a column N of the second matrix with non-zero elements yet to be processed, each replaced element to include a field to identify its logical position within the second matrix, the execution circuitry further to generate a product of a non-zero element at column K of the first matrix and a corresponding non-zero element at row K of the packed second matrix for each non-zero element in row M of the first matrix and each non-zero element in column N of the packed second matrix, and accumulate each generated product with a previous value of a corresponding element at row M and column N of the output matrix.

16. The system of claim 15, wherein the execution circuitry, for each row K of the second matrix, is to determine whether the row contains any zero-valued elements, and, if so, determine whether the row contains any non-zero elements yet to be processed from the zero-valued element, and, if so, for each zero-valued element having a non-zero element yet to be processed, fold the non-zero element into the zero-valued element.

17. The system of claim 15, wherein the execution circuitry, for each column N of the second matrix, is to determine whether the column contains any zero-valued elements, and, if so, determine whether any of P elements of a subsequent column is a non-zero value, and, for each zero-valued element having a non-zero element in the subsequent column, squeeze the non-zero element into the zero-valued element.

18. The system of claim 15, wherein each of the elements stored in the register file includes a field to specify whether it has a zero value, and wherein the execution circuitry is to use the field when determining whether the element has a zero value.

19. The system of claim 15, wherein the execution circuitry is to avoid generating any products of elements having zero values.

20. The system of claim 15, wherein the execution circuitry is to comprise a processing array of (X×Y) processing units, wherein X is less than M and Y is less than N, the execution circuitry to use the processing array iteratively over a plurality of clock cycles to perform the same processing as an actual, physical array of (M×N) processing units.

* * * * *